(12) United States Patent
Loccufier

(10) Patent No.: US 12,448,533 B2
(45) Date of Patent: Oct. 21, 2025

(54) UV CURABLE INKJET INKS AND INKJET PRINTING METHODS

(71) Applicant: AGFA NV, Mortsel (BE)

(72) Inventor: Johan Loccufier, Mortsel (BE)

(73) Assignee: Agfa NV, Mortsel (BE)

( * ) Notice: Subject to any disclaimer, the term of this patent is extended or adjusted under 35 U.S.C. 154(b) by 241 days.

(21) Appl. No.: 18/253,235

(22) PCT Filed: Sep. 23, 2021

(86) PCT No.: PCT/EP2021/076150
§ 371 (c)(1),
(2) Date: May 17, 2023

(87) PCT Pub. No.: WO2022/106100
PCT Pub. Date: May 27, 2022

(65) Prior Publication Data
US 2023/0416547 A1 Dec. 28, 2023

(30) Foreign Application Priority Data

Nov. 19, 2020 (EP) .................................... 20208700

(51) Int. Cl.
| | |
|---|---|
| C09D 11/38 | (2014.01) |
| B41J 2/21 | (2006.01) |
| B41J 11/00 | (2006.01) |
| B41M 7/00 | (2006.01) |
| C09D 11/037 | (2014.01) |
| C09D 11/101 | (2014.01) |
| C09D 11/322 | (2014.01) |

(52) U.S. Cl.
CPC ............. *C09D 11/38* (2013.01); *B41J 2/2107* (2013.01); *B41J 11/00214* (2021.01); *B41M 7/0081* (2013.01); *C09D 11/037* (2013.01); *C09D 11/101* (2013.01); *C09D 11/322* (2013.01)

(58) Field of Classification Search
CPC ........ C09D 11/101; C09D 1/30; C09D 1/322; B05D 3/067; B41J 11/00214; B41J 2/01; B41J 2/2146; B41J 2/515; B41M 7/0081; C03C 2218/119; C03C 17/005; A61L 2300/606; B33Y 70/10; A61C 13/0019
See application file for complete search history.

(56) References Cited

U.S. PATENT DOCUMENTS

| | | | | |
|---|---|---|---|---|
| 2011/0224324 A1* | 9/2011 | Loccufier | ............. | C07D 335/16 560/194 |
| 2013/0286120 A1* | 10/2013 | Kobayashi | ........... | B41J 2/17509 347/102 |
| 2014/0002556 A1* | 1/2014 | Sato | ........................ | C09D 11/30 524/265 |
| 2014/0022299 A1* | 1/2014 | Yokoi | .................. | C09D 11/101 524/590 |
| 2015/0218398 A1* | 8/2015 | Loccufier | ................ | C09D 11/38 522/18 |
| 2016/0039851 A1* | 2/2016 | Müller | ....................... | C07F 9/34 522/63 |
| 2017/0240659 A1* | 8/2017 | Norcini | .................. | C07F 9/3252 |
| 2018/0074399 A1* | 3/2018 | Breton | .................. | C09D 11/101 |
| 2018/0127317 A1* | 5/2018 | Mayr | .................... | A61C 13/083 |
| 2018/0136559 A1* | 5/2018 | Sakai | ....................... | G03F 7/033 |
| 2020/0206389 A1* | 7/2020 | Vange | ..................... | A61L 29/16 |
| 2020/0231715 A1* | 7/2020 | Høj | ........................ | C08F 222/06 |

FOREIGN PATENT DOCUMENTS

WO    WO 2019/243039 A1    12/2019

OTHER PUBLICATIONS

European Patent Office, International Search Report in International Patent Application No. PCT/EP2021/076150, mailed Dec. 14, 2021, 3 pp.
European Patent Office, Written Opinion in International Patent Application No. PCT/EP2021/076150, mailed Dec. 14, 2021, 5 pp.
U.S. Appl. No. 18/253,238, filed May 17, 2023.

* cited by examiner

*Primary Examiner* — John Zimmermann
(74) *Attorney, Agent, or Firm* — Leydig, Voit & Mayer, Ltd.

(57) ABSTRACT

A UV curable inkjet ink including a free radical polymerizable compound and an acyl phosphine oxide initiator wherein the acyl phosphine oxide initiator includes an acyl group selected from the group consisting of a benzoyl group substituted by an urea group or an oxalylamide group; a 2,6-dimethyl benzoyl group substituted in position 3 by an urea group or an oxalylamide group; a 2,6-dimethoxy benzoyl group substituted in position 3 by an urea group or an oxalylamide group; a 2,4,6-trimethyl benzoyl group substituted in position 3 by an urea group or an oxalylamide group; and a 2,4,6-trimethoxybenzoyl group substituted in position 3 by an urea group or an oxalylamide group wherein the urea group and the oxalylamide group include a tertiary amine group positioning a phosphorus atom of the acylphosphine oxide initiator in a 1 to Z position, where position 1 is defined as that of the phosphorus atom and position Z is defined as the nitrogen atom of the tertiary amine group with Z representing an integer of at least 11; and that the acyl phosphine oxide initiator contains no more than two photoinitiating moieties having a phosphine oxide group.

17 Claims, No Drawings

UV CURABLE INKJET INKS AND INKJET PRINTING METHODS

CROSS-REFERENCE TO RELATED APPLICATIONS

This patent application is the U.S. national stage of copending International Patent Application No. PCT/EP2021/076150, filed Sep. 23, 2021, which claims the benefit of European Patent Application No. 20208700.3, filed Nov. 19, 2020.

TECHNICAL FIELD

The present invention relates to UV curable inkjet inks optimized for surface cure in LED curing and low odor.

BACKGROUND ART

Industrial inkjet printing systems are increasingly replacing analogue printing systems, like offset and flexography, because of their flexibility in use and variable data printing capability. UV curable inkjet inks are particularly preferred because high quality colour images can be printed on non-absorbing ink-receivers, such as plastic or metal.

In radiation curable technology, LED curing is becoming ever more important. Specifically, bathochromic LED's having an emitting wavelength between 365 nm and 400 nm are the work horses in state of the art curing technology, requiring specific initiators in comparison to the classical mercury bulbs. Acyl phosphine oxides are a preferred class of photoinitiators for LED curing.

Standard acyl phosphine oxides are not functionalized on the mesityl group, leading to the formation of volatile aldehydes upon curing, resulting in a bad smell. This makes them less suitable for applications such as interior decoration. To solve this issue, a new class of acyl phosphine initiators has been disclosed in WO 2019/243039 (AGFA NV).

Acyl phosphine oxide photoinitiators, including the acyl phosphine oxide photoinitiators disclosed in WO 2019/243039 (AGFA NV), are known to have limitations for surface cure, a problem that is even more pronounced when using LED curing. This leads to unacceptable physical properties and
possible health risks caused by residual uncured monomers at the surface of the cured composition.

One way to improve insufficient surface cure is to perform UV curing in the absence of oxygen. Oxygen inhibition of the curing at surface of an ink layer can be improved by applying a so-called 'nitrogen blanket', as illustrated in e.g. U.S. Pat. No. 6,550,905 (DOTRIX). However, the implementation of one or more oxygen depletion units using an inert gas to deplete oxygen from the region between the UV source and the printed inks positioned close to the substrate surface makes an inkjet printer complex and expensive.

Therefore, there is a need for UV curable inkjet inks exhibiting improved surface cure properties in the absence of an oxygen depletion unit in the UV curing section of an inkjet printer, while still reducing bad odor.

SUMMARY OF INVENTION

In order to overcome the problems described above, preferred embodiments of the present invention have been realized with UV curable inkjet inks including a free radical polymerizable compound and an acyl phosphine oxide initiator as described here below.

It was found that specific acyl phosphine oxide initiators substituted by a tertiary amine in a specific position in view of a phosphorus atom of the phosphine oxide group surprisingly exhibited improved surface cure properties of UV curable inkjet inks, while still reducing bad odor.

Acyl phosphine oxide photoinitiators functionalized with high dipole self-complementary functional groups on the mesitaldehyde, selected from the group consisting of a urea group and an oxalyl amide group were found to be effective in reducing the odor of a cured UV curable composition. The figure here below illustrates how the volatile compounds are believed to interact leading to a reduction of bad odor.

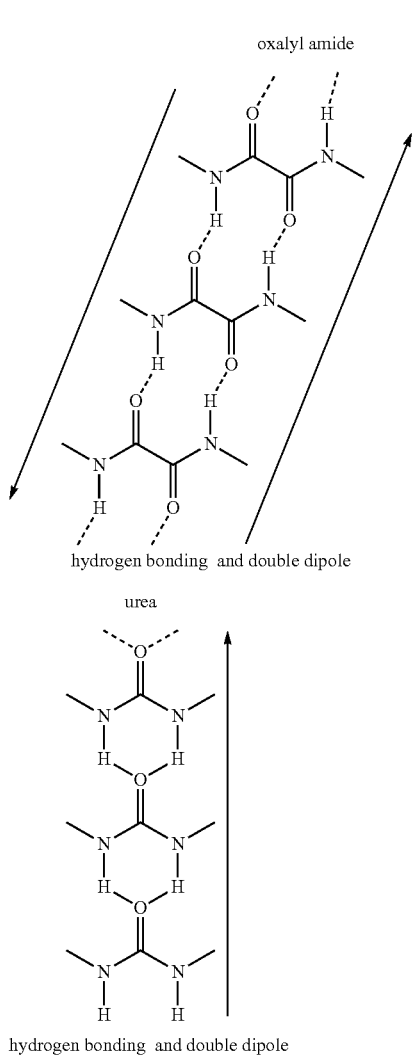

The size of polymeric and multifunctional photoinitiators has a significant impact on the reactivity of radiation curable compositions when cured under ambient atmosphere. Upon increasing molecular weight, oxygen inhibition is becoming more and more pronounced as diffusion of the initiating radical is slowing down in function of its molecular weight whereas oxygen keeps on diffusing very fast. In principle the problem can be solved by curing under inert atmosphere. However, the need for applying nitrogen blankets complicates the inkjet printer design and induces additional cost.

An approach to print under ambient conditions is highly preferred. For achieving an optimal balance between curing speed and migration properties, it was found that an acylphosphine oxide photoinitiator according to the present invention should contain no more than two photoinitiating moieties having a phosphine oxide group, i.e. a monofunctional acylphosphine oxide photoinitiator, but preferably a difunctional acylphosphine oxide photoinitiator. The molecular weight of the acylphosphine oxide photoinitiator is preferably no more than 3000, more preferably no more than 2000 and most preferably no more than 1500.

It is a further object of the present invention to provide an inkjet printing method using an UV curable inkjet ink according to the present invention.

These and other objects will become apparent from the detailed description hereinafter.

DESCRIPTION OF EMBODIMENTS

Definitions

The term "multifunctional" in e.g. multifunctional acrylate means that the compound contains more than two acrylate groups.

The term "alkyl" means all variants possible for each number of carbon atoms in the alkyl group i.e. methyl, ethyl, for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethyl-propyl and 2-methyl-butyl, etc.

The term "substituted", in e.g. substituted alkyl group means that the alkyl group may be substituted by other atoms than the atoms normally present in such a group, i.e. carbon and hydrogen. For example, a substituted alkyl group may include a halogen atom or a thiol group. An unsubstituted alkyl group contains only carbon and hydrogen atoms.

Unless otherwise specified a substituted alkyl group, a substituted alkenyl group, a substituted alkynyl group, a substituted aralkyl group, a substituted alkaryl group, a substituted aryl and a substituted heteroaryl group are preferably substituted by one or more constituents selected from the group consisting of methyl, ethyl, n-propyl, isopropyl, n-butyl, isobutyl and tertiary-butyl, ester, amide, ether, thioether, ketone, aldehyde, sulfoxide, sulfone, sulfonate ester, sulphonamide, —Cl, —Br, —I, —OH, —SH, —CN and —NO$_2$.

Unless otherwise specified a substituted or unsubstituted alkyl group is preferably a $C_1$ to $C_6$-alkyl group.

Unless otherwise specified a substituted or unsubstituted alkenyl group is preferably a $C_2$ to $C_6$-alkenyl group.

Unless otherwise specified a substituted or unsubstituted alkynyl group is preferably a $C_2$ to $C_6$-alkynyl group.

Unless otherwise specified a substituted or unsubstituted aralkyl group is preferably a phenyl or naphthyl group including one, two, three or more $C_1$ to $C_6$-alkyl groups.

Unless otherwise specified a substituted or unsubstituted alkaryl group is preferably a $C_7$ to $C_{25}$-alkyl group including a phenyl group or a naphthyl group.

A cyclic group includes at least one ring structure and may be a monocyclic- or polycyclic group, the latter meaning one or more rings fused together.

A heterocyclic group is a cyclic group that has atoms of at least two different elements as members of its ring(s). The counterparts of heterocyclic groups are homocyclic groups, the ring structures of which are made of carbon only. Unless otherwise specified a substituted or unsubstituted heterocyclic group is preferably a five- or six-membered ring substituted by one, two, three or four heteroatoms, preferably selected from oxygen atoms, nitrogen atoms, sulfur atoms, selenium atoms or combinations thereof.

An alicyclic group is a non-aromatic homocyclic group wherein the ring atoms consist of carbon atoms.

The term heteroaryl group means a monocyclic- or polycyclic aromatic ring comprising carbon atoms and one or more heteroatoms in the ring structure, preferably, 1 to 4 heteroatoms, independently selected from nitrogen, oxygen, selenium and sulphur. Preferred examples of heteroaryl groups include, but are not limited to, pyridinyl, pyridazinyl, pyrimidyl, pyrazyl, triazinyl, pyrrolyl, pyrazolyl, imidazolyl, (1,2,3,)- and (1,2,4)-triazolyl, pyrazinyl, pyrimidinyl, tetrazolyl, furyl, thienyl, isoxazolyl, thiazolyl, isoxazolyl, and oxazolyl. A heteroaryl group can be unsubstituted or substituted with one, two or more suitable substituents. Preferably, a heteroaryl group is a monocyclic ring, wherein the ring comprises 1 to 5 carbon atoms and 1 to 4 heteroatoms. More preferably a substituted or unsubstituted heteroaryl group is preferably a five- or six-membered ring substituted by one, two or three oxygen atoms, nitrogen atoms, sulphur atoms, selenium atoms or combinations thereof.

Unless otherwise specified an unsubstituted aryl group is preferably a phenyl group or naphthyl group.

Unless otherwise specified an acyl group is preferably a —C(=O)—R group wherein R is selected from the group consisting of an optionally substituted alkyl group, an optionally substituted aryl group, an optionally substituted heteroaryl group, an optionally substituted alkenyl group, an optionally substituted alkynyl group, an optionally substituted alkaryl group and an optionally substituted aralkyl group.

UV Curable Inkjet Inks

A UV curable inkjet ink in accordance with the invention includes a free radical polymerizable compound and an acyl phosphine oxide initiator, wherein the acyl phosphine oxide initiator includes an acyl group selected from the group consisting of a benzoyl group substituted by an urea group or an oxalylamide group; a 2,6-dimethyl benzoyl group substituted in position 3 by an urea group or an oxalylamide group; a 2,6-dimethoxy benzoyl group substituted in position 3 by an urea group or an oxalylamide group; a 2,4,6-trimethyl benzoyl group substituted in position 3 by an urea group or an oxalylamide group; and a 2,4,6-trimethoxybenzoyl group substituted in position 3 by an urea group or an oxalylamide group, characterized in that the urea group and the oxalylamide group include a tertiary amine group positioning a phosphorus atom of the acylphosphine oxide initiator in a 1 to Z position, where position 1 is defined as that of the phosphorus atom and position Z is defined as the nitrogen atom of the tertiary amine group with Z representing an integer of at least 11, preferably selected from 12 to 16; and that the acyl phosphine oxide initiator contains no more than two photoinitiating moieties having a phosphine oxide group.

The acyl phosphine oxide initiator is preferably substituted by an oxalylamide group as it was observed that such an initiator generally exhibits a better solubility in a wide range of monomers compared to its urea equivalent.

In a preferred embodiment, the acyl phosphine oxide initiator contains no thiol group if the acyl group includes an urea group.

In a first embodiment of the UV curable inkjet ink according to the invention, the acyl phosphine oxide initiator is represented by formula I:

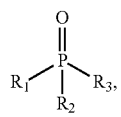

formula I wherein
$R_1$ represents a group according to formula II, with the dotted line representing the point of attachment to the phosphorus atom in formula I,

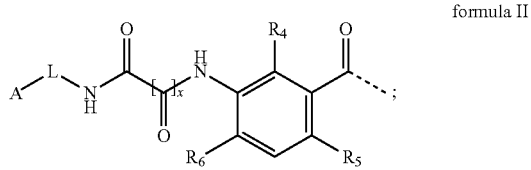

formula II $R_2$ is selected from the group consisting of a substituted or unsubstituted aryl group, a substituted or unsubstituted heteroaryl group and $OR_7$;

$R_3$ is selected from the group consisting of a substituted or unsubstituted aryl group, a substituted or unsubstituted heteroaryl group and an acyl group;

$R_4$, $R_5$ and $R_6$ are independently selected from the group consisting of hydrogen, a methyl group and a methoxy group; $R_7$ is selected from the group consisting of hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group and a substituted or unsubstituted aryl or heteroaryl group; x represents an integer having a value of 0 or 1; L represents a divalent linking group having no more than 5 carbon atoms; and A represents an aliphatic tertiary amine.

A substituent in the groups listed for $R_7$ may be a (meth)acryloyl group, preferably an acryloyl group.

In one more preferred embodiment, the acyl group $R_3$ is selected from the group consisting of a benzoyl group, a 2,6-dimethyl benzoyl group, a 2,6-dimethoxy benzoyl group, a 2,4,6-trimethyl benzoyl group and a 2,4,6-trimethoxybenzoyl group.

In another more preferred embodiment, the acyl group $R_3$ represents a group $R_1$ according to formula II.

In any of the above embodiments of the UV curable inkjet ink, the aliphatic tertiary amine is preferably is substituted by alkyl groups independently selected from methyl, ethyl, propyl and butyl.

There is no limitation in the present invention to combine the above preferred embodiments.

In a second embodiment of the UV curable inkjet ink according to the invention, the acyl phosphine oxide initiator is represented by formula III:

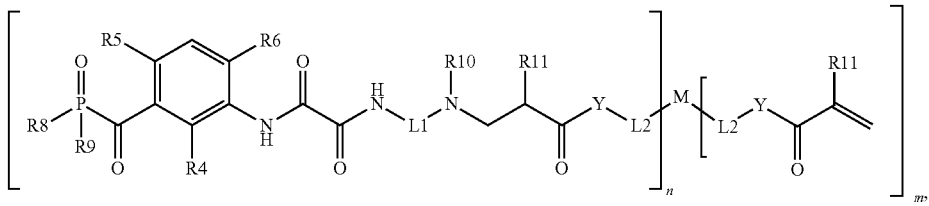

formula III wherein
R4, R5 and R6 are independently selected from the group consisting of hydrogen, a methyl group and a methoxy group;

R8 is selected from the group consisting of a substituted or unsubstituted aryl group, a substituted or unsubstituted heteroaryl group and OR12;

R9 is selected from the group consisting of a substituted or unsubstituted aryl group, a substituted or unsubstituted heteroaryl group and an acyl group;

R10 represents a substituted or unsubstituted alkyl group;

R11 is selected from the group consisting of a hydrogen and a methyl group;

Y is selected from the group consisting of an oxygen and NR13;

R12 and R13 are independently selected from the group consisting of hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group and a substituted or unsubstituted aryl or heteroaryl group;

L1 represents a substituted or unsubstituted $C_2$ to $C_6$ alkylene group;

L2 represents a divalent linking group comprising no more than 10 carbon atoms;

n represents an integer 1 or 2;

m represents an integer from 0 to 3; and

M represents hydrogen if m=0; a covalent bond if n=m=1 or an n+m-valent moiety if n>1 and m>0.

In a preferred embodiment of the UV curable inkjet ink, R9 is an acyl group selected from the group consisting of a benzoyl group, a 2,6-dimethyl benzoyl group, a 2,6-dimethoxy benzoyl group, a 2,4,6-trimethyl benzoyl group and a 2,4,6-trimethoxybenzoyl group.

In a preferred embodiment of the UV curable inkjet ink, the n+m-valent moiety M represents an aliphatic moiety comprising 1 to 10 carbon atoms, more preferably 1 to 6 carbon atoms and most preferably 1 to 4 carbon atoms.

In a preferred embodiment, R4, R5 and R6 all represent a methyl group.

There is no limitation in the present invention to combine the above preferred embodiments.

A particularly preferred difunctional acylphosphine oxide photoinitiator is a compound according to Formula IV:

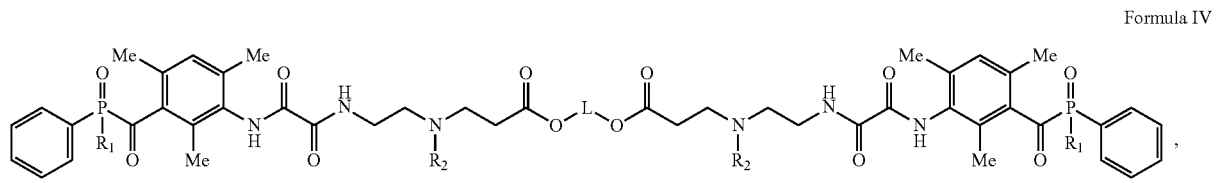

Formula IV wherein $R_1$ represents OEt or phenyl; $R_2$ represents a $C_1$ to $C_8$ alkyl group; and L represents a divalent linking group having no more than 20 carbon atoms being not further functionalized with acrylates.

In a preferred embodiment $R_2$ represents a $C_1$ to $C_4$ alkyl group, an ethyl and a methyl group being particularly preferred.

In a particularly preferred embodiment of the UV curable inkjet ink, the acyl phosphine oxide initiator is selected from the group in Table 1 without being limited thereto.

TABLE 1

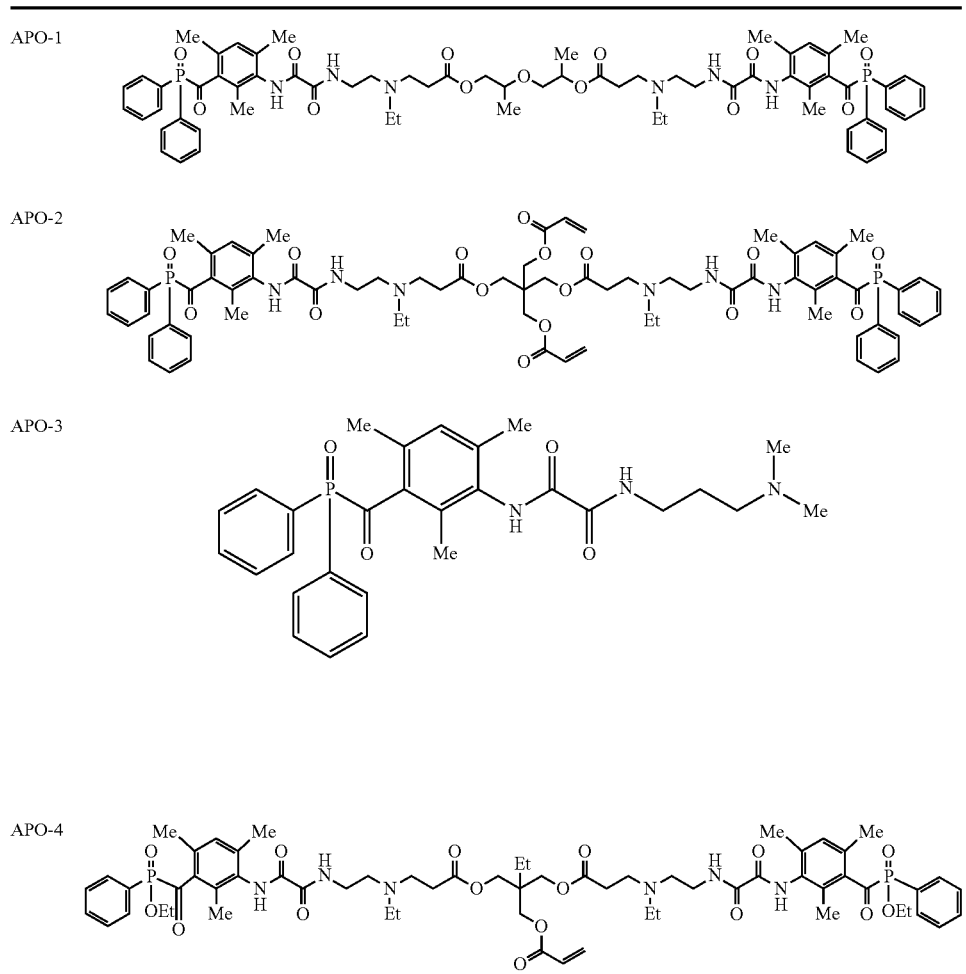

TABLE 1-continued

APO-5 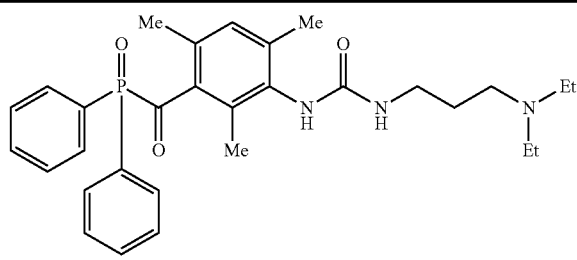

APO-6 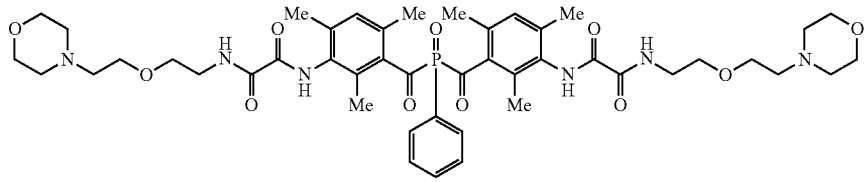 [SMILES: Cc1cc(C)c(C(=O)P(=O)(C(=O)c2c(C)cc(C)c(NC(=O)C(=O)NCCOCCN3CCOCC3)c2C)c2ccccc2)c(C)c1NC(=O)C(=O)NCCOCCN1CCOCC1]

APO-7 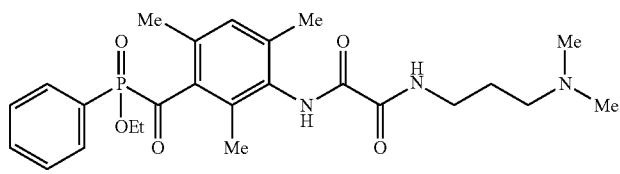 [SMILES: CCOP(=O)(C(=O)c1c(C)cc(C)c(NC(=O)C(=O)NCCCN(C)C)c1C)c1ccccc1]

APO-8 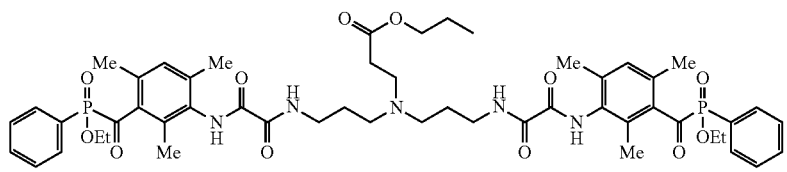 [SMILES: CCCOC(=O)CCN(CCCNC(=O)C(=O)Nc1c(C)cc(C)c(C(=O)P(=O)(OCC)c2ccccc2)c1C)CCCNC(=O)C(=O)Nc1c(C)cc(C)c(C(=O)P(=O)(OCC)c2ccccc2)c1C]

APO-9 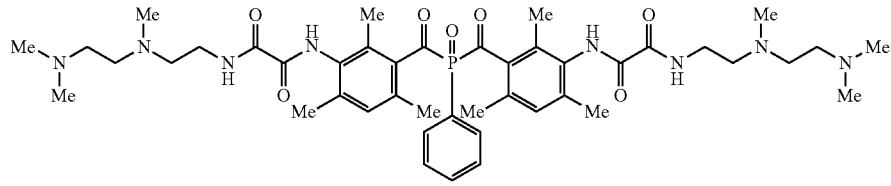 [SMILES: Cc1cc(C)c(C(=O)P(=O)(C(=O)c2c(C)cc(C)c(NC(=O)C(=O)NCCN(C)CCN(C)C)c2C)c2ccccc2)c(C)c1NC(=O)C(=O)NCCN(C)CCN(C)C]

APO-10 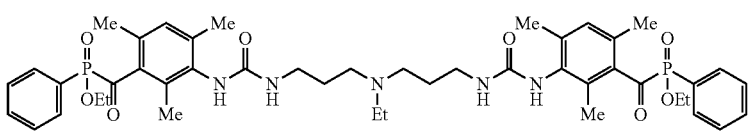 [SMILES: CCOP(=O)(C(=O)c1c(C)cc(C)c(NC(=O)NCCCN(CC)CCCNC(=O)Nc2c(C)cc(C)c(C(=O)P(=O)(OCC)c3ccccc3)c2C)c1C)c1ccccc1]

In a particularly preferred embodiment of the UV curable inkjet ink, a combination of the above acyl phosphine oxide initiators is present in the inkjet ink, preferably a combination of acyl phosphine oxide initiators described above for the first and second embodiment described above.

The acyl phosphine oxide initiator is preferably present in an amount between 1 and 25 wt %, more preferably 2 and 18 wt %, most preferably between 3 and 15 wt %, with the wt % based on the total weight of the UV curable inkjet ink.

The UV curable inkjet ink may be a colourless UV curable inkjet ink, but preferably it contains a colorant. Colourless UV curable inkjet inks may be used, for example, as a primer to improve adhesion to substrate, or as a varnish to improve the glossiness of an image.

The UV curable inkjet ink may include other ingredients such as a compound selected from the group consisting of dispersants, surfactants and polymerization inhibitors.

For having a good ejecting ability, the viscosity of the UV curable inkjet ink at the jetting temperature is preferably smaller than 30.0 mPa·s, more preferably smaller than 20.0 mPa·s, most preferably between 5.0 and 16.0 mPa·s at a shear rate of 1000 s$^{-1}$ and at a jetting temperature between 30 and 70° C., preferably at a temperature of 45° C.

The surface tension of the UV curable inkjet ink is preferably in the range of 20 mN/m to 35 mN/m at 25° C., more preferably in the range of about 22 mN/m to about 30 mN/m at 25° C. In these ranges, good ink spreading is obtained on a wide range of substrates.

A single UV curable inkjet ink can be used, but preferably a UV curable inkjet ink set containing a plurality of UV curable inkjet inks in accordance with the invention is used.

For printing multi-colour images, the UV curable inkjet ink is part of a UV curable inkjet ink set. A preferred UV curable inkjet ink set for printing different colours contains at least three but most preferably at least four UV curable inkjet inks in accordance with the invention. The inkjet ink set is preferably a UV curable CMYK or CRYK inkjet ink set, preferably further including a UV curable white inkjet ink for enhancing colour vibrancy. This inkjet ink set may also be extended with extra inks such as violet, green, red, blue, and/or orange to further enlarge the colour gamut of the image. The UV curable inkjet ink set may also be extended by the combination of full density inkjet inks with light density inkjet inks. The combination of dark and light colour inks and/or black and grey inks improves the image quality by a lowered graininess.

In a particularly preferred embodiment, the UV curable inkjet ink set in accordance with the invention includes:
- a cyan UV curable inkjet ink containing a beta-copper phthalocyanine pigment;
- a red UV curable inkjet ink containing a pigment selected from the group consisting of C.I. Pigment Red 57/1, C.I. Pigment Red 122, C.I. Pigment Red 170, C.I. Pigment Red 175, C.I. Pigment Red 176, C.I. Pigment Red 187, C.I. Pigment Red 188, C.I. Pigment Red 207, C.I. Pigment Red 242, C.I. Pigment Red 254, C.I. Pigment Red 272 and mixed crystals thereof;
- a yellow UV curable inkjet ink containing a pigment selected from C.I. Pigment Yellow 74 C.I. Pigment Yellow 83, C.I. Pigment Yellow 97, C.I. Pigment Yellow 110, C.I. Pigment Yellow 120, C.I. Pigment Yellow 138, C.I. Pigment Yellow 150, C.I. Pigment Yellow 151, C.I. Pigment Yellow 154, C.I. Pigment Yellow 155, C.I. Pigment Yellow 175, C.I. Pigment Yellow 180, C.I. Pigment Yellow 181, C.I. Pigment Yellow 194, C.I. Pigment Yellow 213, C.I. Pigment Yellow 214 and mixed crystals thereof; and
- a black UV curable inkjet ink containing a carbon black pigment; preferably complemented by a white ink and/or a colourless ink.

It was found that such an ink set was especially useful for reproducing wood patterns with minimal ink consumption in addition to improved low odor and surface cure properties. Low odor is essential when manufacturing indoor decorative articles for rooms and vehicles, such as furniture, wallpaper, doors, natural leather articles, textile fabrics and decorative panels (e.g. flooring laminate panels).

Synthesis Methods for Acylphosphineoxide Initiators

The acyl phosphine oxide initiator of the UV curable inkjet ink of the second embodiment can be prepared from an intermediate represented by Formula IV:

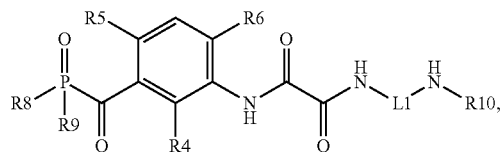

wherein
R4, R5 and R6 are independently selected from the group consisting of hydrogen, a methyl group and a methoxy group; R8 is selected from the group consisting of a substituted or unsubstituted aryl group, a substituted or unsubstituted heteroaryl group and OR12; R9 is selected from the group consisting of a substituted or unsubstituted aryl group, a substituted or unsubstituted heteroaryl group and an acyl group; R10 represents a substituted or unsubstituted alkyl group; R12 is selected from the group consisting of hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group and a substituted or unsubstituted aryl or heteroaryl group; and L1 represents a substituted or unsubstituted $C_2$ to $C_6$ alkylene group.

The synthesis of the intermediate is executed by using a diamine of which one amine is a primary amine and the other amine is a secondary amine. By selecting such a diamine, it was surprisingly found that the aminolysis proceeded with 100% selectivity, thus allowing to selective produce tertiary amines on Michael-addition to e.g. acrylates. The synthesis of the intermediate is shown here below as the first step in the preparation an acyl phosphine oxide initiator in accordance with the invention. Alternatively, in order to obtain an acyl phosphine oxide initiator such as APO-3, APO-5 and APO-7 shown above, a diamine can be used of which one amine is a primary amine and the other amine is a tertiary amine.

A method for preparing an acyl phosphine oxide initiator in accordance with the second embodiment of the invention includes the steps:

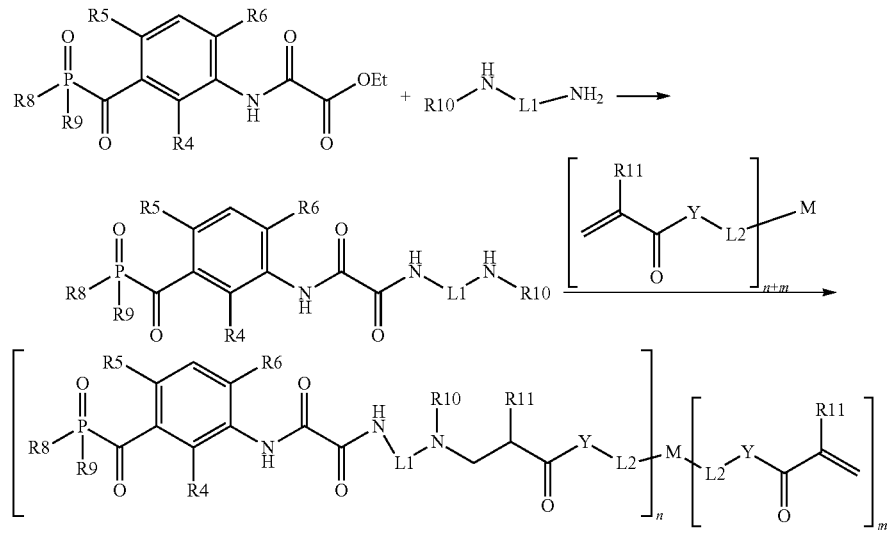

wherein
R4, R5 and R6 are independently selected from the group consisting of hydrogen, a methyl group and a methoxy group;
R8 is selected from the group consisting of a substituted or unsubstituted aryl group, a substituted or unsubstituted heteroaryl group and OR12;
R9 is selected from the group consisting of a substituted or unsubstituted aryl group, a substituted or unsubstituted heteroaryl group and an acyl group;
R10 represents a substituted or unsubstituted alkyl group;
R11 is selected from the group consisting of a hydrogen and a methyl group;
Y is selected from the group consisting of an oxygen and NR13;
R12 and R13 are independently selected from the group consisting of hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group and a substituted or unsubstituted aryl or heteroaryl group;
L1 represents a substituted or unsubstituted $C_2$ to $C_6$ alkylene group;
L2 represents a divalent linking group comprising no more than 10 carbon atoms;
n represents an integer 1 or 2;
m represents an integer from 0 to 3; and
M represents hydrogen if m=0; a covalent bond if n=m=1 or an n+m-valent moiety if n>1 and m>0.

In the second step of the above synthesis scheme, the intermediate reacts with a mono-, di- or multifunctional (meth)acrylate or a mono-, di- or multifunctional (meth)acrylamide, preferably with a mono-, di- or multifunctional (meth)acrylate and more preferably a mono-, di- or multifunctional acrylate.

In a further preferred embodiment, said mono-, di- or multifunctional acrylate or methacrylate is a di- or multifunctional acrylate or methacrylate, more preferably an acrylate and most preferably selected from the group consisting of poly(ethylene glycol) diacrylate, dipropylene glycol diacrylate, tripropylene glycol diacrylate, pentaerythritol triacrylate and ethoxylated or propoxylated derivatives thereof, trimethylol propane triacrylate and ethoxylated and propoxylated derivatives thereof, dipentaerythritol pentaacrylate and ethoxylated and propoxylated derivatives thereof, neopentyl glycol diacrylate and ethoxylated and propoxylated derivatives thereof, dipentaerythritol hexaacrylate and ethoxylated and propoxylated derivatives thereof, glycerol triacrylate and ethoxylated and propoxylated derivatives thereof, ditrimethylolpropane tetraacrylate and ethoxylated and propoxylated derivatives thereof, hexamethylene diacrylate and ethoxylated and propoxylated derivatives thereof, neopentylglycol hydroxypivalate diacrylate, tricyclodecanedimethanol diacrylate and 3-methyl-1,5-pentanediyl diacrylate. Di-, tri- and tetrafunctional acrylates are particularly preferred.

In a preferred synthesis method, M represents an aliphatic moiety comprising 1 to 10 carbon atoms, more preferably 1 to 6 carbon atoms and most preferably 1 to 4 carbon atoms.

In a preferred embodiment, R9 is an acyl group selected from the group consisting of a benzoyl group, a 2,6-dimethyl benzoyl group, a 2,6-dimethoxy benzoyl group, a 2,4,6-trimethyl benzoyl group and a 2,4,6-trimethoxybenzoyl group.

In a preferred embodiment, the diamine represented by formula R10-NH-L1-NH$_2$ is selected from the group consisting of N-methyl-ethylene diamine, N-ethyl-ethylene diamine, N-isopropyl-ethylene diamine, N-butyl-ethylene diamine, caldopentamine, dimethyl-dipropylene diamine, N-methyl-1,3-propane diamine, N-ethyl-1,3-propane diamine, N-propyl-1,3-propane diamine, N-(2-methylpropyl)-1,3-propane diamine, N-octyl-1,3-propane diamine, spermidine, spermine, bis(3-aminopropyl)amine, N,N'-bis(3-aminopropyl)ethylene diamine, N-(2-hydroxyethyl)-1,3-propane-diamine, diethylene triamine, triethylene tetramine and tetraethylene pentamine;

A method for preparing an acyl phosphine oxide initiator for the first embodiment includes the steps:

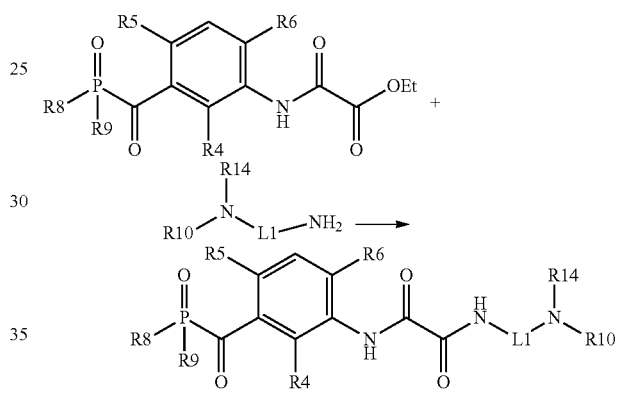

wherein
R4, R5 and R6 are independently selected from the group consisting of hydrogen, a methyl group and a methoxy group;
R8 is selected from the group consisting of a substituted or unsubstituted aryl group, a substituted or unsubstituted heteroaryl group and OR12;
R9 is selected from the group consisting of a substituted or unsubstituted aryl group, a substituted or unsubstituted heteroaryl group and an acyl group;
R10 and R14 independently represent a substituted or unsubstituted alkyl group;
R12 is selected from the group consisting of hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group and a substituted or unsubstituted aryl or heteroaryl group; and
L1 represents a substituted or unsubstituted $C_2$ to $C_6$ alkylene group.

In a preferred embodiment of the synthesis method, R10 and R14 independently represent methyl or ethyl.

Difunctional photoinitiators, prepared according to the following scheme, are particularly preferred.

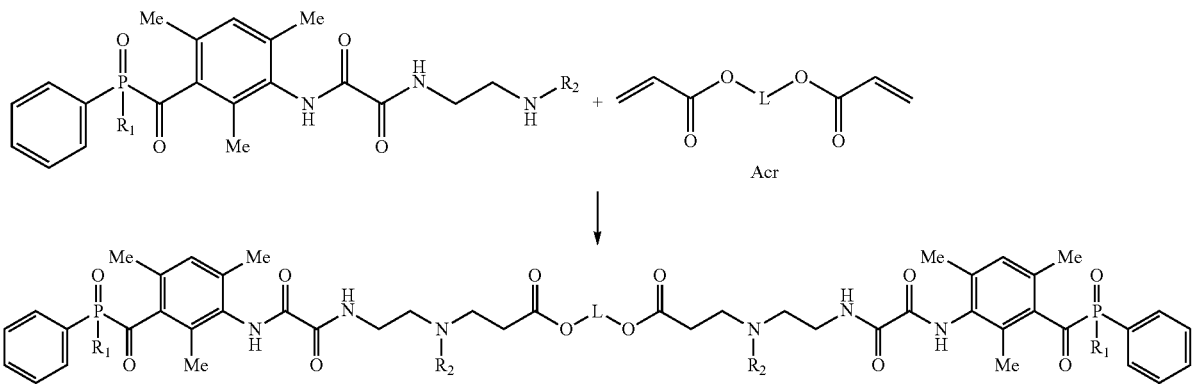

wherein $R_1$ represents OEt or phenyl; $R_2$ represents a $C_1$ to $C_8$ alkyl group; and L represents a divalent linking group having no more than 20 carbon atoms being not further functionalized with acrylates. In a preferred embodiment $R_2$ represents a $C_1$ to $C_4$ alkyl group, an ethyl and a methyl group being particularly preferred. The difunctional acrylate Acr used in the above synthesis is preferably selected from the compounds Acr-1 to Acr-15, without being limited thereto.

| | | |
|---|---|---|
| Acr-1 | Acr-2 | Acr-3 |
| Acr-4 | n = 4 on average Acr-5 | Acr-6 |
| Acr-7 | Acr-8 | Acr-9 |
| Acr-10 | Acr-11 | Acr-12 |
| Acr-13 | Acr-14 | Acr-15 |

Other Photoinitiators and Co-Initiators

In addition to the specific acyl phosphine oxide photoinitiator, the UV curable inkjet ink may contain one or more other photoinitiators and/or co-initiators.

The other photoinitiator in the UV curable inkjet ink is preferably a free radical initiator, more specifically a Norrish type I initiator or a Norrish type II initiator.

Preferred free radical photoinitiators are selected from the group consisting of polymerizable photoinitiators, polymeric photoinitiators and multifunctional photoinitiators.

Suitable photoinitiators are disclosed in CRIVELLO, J. V., et al. Photoinitiators for Free Radical Cationic and Anionic Photopolymerization. 2nd edition. Edited by BRADLEY, G. London, UK: John Wiley and Sons Ltd, 1998. p. 287-294.

The acyl phosphine oxide photoinitiator in the UV curable inkjet ink is preferably combined with a photoinitiator selected from the group consisting of a thioxanthone compound, an α-hydroxyalkylphenone compound and a carbazole compound. Such combinations allow to improve curing speed further.

A preferred combination of an acyl phosphine oxide photoinitiator in the UV curable inkjet ink is that with a second photoinitiator of the acyl phosphine oxide type for improving curability of the UV curable inkjet ink.

In order to increase the photosensitivity further, the UV curable inkjet ink may contain co-initiators. Suitable examples of these co-initiators can be categorized in three groups: 1) tertiary aliphatic amines such as methyldiethanolamine, dimethylethanolamine, triethanolamine, triethylamine and N-methylmorpholine; (2) aromatic amines such as amylparadimethylaminobenzoate, 2-n-butoxyethyl-4-(dimethylamino) benzoate, 2-(dimethylamino)ethylbenzoate, ethyl-4-(dimethylamino)benzoate, and 2-ethylhexyl-4-(dimethylamino)benzoate; and (3) (meth)acrylated amines such as dialkylamino alkyl(meth)acrylates (e.g., diethylaminoethylacrylate) or N-morpholinoalkyl-(meth)acrylates (e.g., N-morpholinoethyl-acrylate). The preferred co-initiators are aminobenzoates.

A combination of a polymerizable co-initiator containing a tertiary amine and a polymeric co-initiator containing a tertiary amine may be advantageously used to adjust the viscosity of the UV curable inkjet ink.

Polymerizable Compounds

Any free radical polymerizable compound commonly known in the art may be employed. The polymerizable compound may be any monomer and/or oligomer found in the Polymer Handbook Vol 1+2, 4th edition, edited by J. BRANDRUP et al., Wiley-Interscience, 1999. An oligomer in the present invention is understood to contain 2 to 8 repeating monomeric units. Polymerizable polymers may also be used.

A monofunctional polymerizable compound is generally used for enhancing the flexibility of a cured layer, whereas a polyfunctional polymerizable compound is used for enhancing scratch resistance of the cured layer.

A monofunctional polymerizable compound contains a single polymerizable group, preferably a free radical polymerizable group selected from the group consisting of an acrylate, a methacrylate, an acrylamide, a methacrylamide, a styrene group, a maleate, a fumarate, an itaconate, a vinyl ether, a vinyl ester, an allyl ether and an allyl ester.

A polyfunctional polymerizable compound contains two, three or more polymerizable groups, preferably free radical polymerizable groups selected from the group consisting of an acrylate, a methacrylate, an acrylamide, a methacrylamide, a styrene group, a maleate, a fumarate, an itaconate, a vinyl ether, a vinyl ester, an allyl ether and an allyl ester.

In a preferred embodiment, the monofunctional polymerizable compounds are selected from acrylic acid, methacrylic acid, maleic acid (or there salts), maleic anhydride, alkyl(meth)acrylates (linear, branched and cycloalkyl) such as methyl(meth)acrylate, n-butyl(meth)acrylate, tert-butyl (meth)acrylate, cyclohexyl(meth)acrylate, and 2-ethylhexyl (meth)acrylate; aryl(meth)acrylates such as benzyl(meth) acrylate, and phenyl(meth)acrylate; hydroxyalkyl(meth) acrylates such as hydroxyethyl(meth)acrylate, and hydroxypropyl(meth)acrylate; (meth)acrylates with other types of functionalities (e.g. oxiranes, amino, fluoro, polyethylene oxide, phosphate substituted) such as glycidyl (meth)acrylate, dimethylaminoethyl(meth)acrylate, trifluoroethyl acrylate, methoxypolyethyleneglycol (meth)acrylate, and tripropyleneglycol (meth)acrylate phosphate; allyl derivatives such as allyl glycidyl ether; styrenics such as styrene, 4-methylstyrene, 4-hydroxystyrene, 4-acetostyrene, and styrenesulfonic acid; (meth)acrylonitrile; (meth)acrylamides (including N-mono and N,N-disubstituted) such as N-benzyl (meth)acrylamide; maleimides such as N-phenyl maleimide; vinyl derivatives such as vinylcaprolactam, vinylpyrrolidone, vinylimidazole, vinylnapthalene, and vinyl halides; vinylethers such as vinylmethyl ether; vinylesters of carboxylic acids such as vinylacetate, vinylbutyrate, and vinyl benzoate.

In a more preferred embodiment, the monofunctional polymerizable compounds are selected from monoacrylates and vinyllactams, such as N-vinylcaprolactam. Particularly preferred monofunctional polymerizable compounds are selected from the group consisting of isoamyl acrylate, stearyl acrylate, lauryl acrylate, octyl acrylate, decyl acrylate, isoamyl acrylate, isostearyl acrylate, 2-ethylhexyl-diglycol acrylate, 2-hydroxybutyl acrylate, 2-acryloyloxyethylhexahydrophthalic acid, butoxyethyl acrylate, ethoxydiethylene glycol acrylate, methoxydiethylene glycol acrylate, methoxypolyethylene glycol acrylate, methoxypropylene glycol acrylate, phenoxyethyl acrylate, tetrahydrofurfuryl acrylate, isobornyl acrylate, 2-hydroxyethyl acrylate, 2-hydroxypropyl acrylate, 2-hydroxy-3-phenoxypropyl acrylate, vinyl ether acrylate, 2-acryloyloxyethylsuccinic acid, 2-acryloyxyethylphthalic acid, 2-acryloxyethyl-2-hydroxyethyl-phthalic acid, lactone modified flexible acrylate, t-butylcyclohexyl acrylate, caprolactone acrylate, cyclic trimethylolpropane formal acrylate, cyclic trimethylolpropane formal acrylate, ethoxylated nonyl phenol acrylate, isodecyl acrylate, isooctyl acrylate, octyldecyl acrylate, alkoxylated phenol acrylate, tridecyl acrylate and acryloylmorpholine In a preferred embodiment, the monofunctional polymerizable compound is selected from monoacrylates and vinyllactams, such as N-vinylcaprolactam.

The N-vinyllactam is preferably a compound represented by Formula (I):

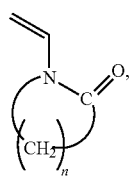

Formula (I)

wherein n denotes an integer of 2 to 6; n is preferably an integer of 3 to 5 from the viewpoint of flexibility after the ink composition is cured, adhesion to a substrate, and ready availability of starting materials, n is more preferably 3 or 5, and n is particularly preferably 5, which is N-vinylcaprolactam. N-vinylcaprolactam is preferable since it is readily available at a relatively low price, and gives particularly good ink curability and adhesion of a cured film to a recording medium.

The N-vinyllactam may have a substituent such as an alkyl group or an aryl group on the lactam ring, and may have a saturated or unsaturated ring structure bonded to the lactam ring. The compound represented by Formula (a) may be used singly or in a combination of two or more compounds.

Another preferred monomer is vinyl methyl oxazolidinone, available as VMOX from BASF.

For certain applications preferably no monofunctional (meth)acrylates are employed. For example, when the substrate is a textile that is worn directly on the human skin it may give rise to skin sensitization. In such a case, the monomers and oligomers are preferably selected from a group comprising or consisting of vinyls, acrylamides, methacrylamides, vinyl carbonates, vinyl ethers, vinyl esters, vinyl carbamates, allyl ethers, allyl esters and their corresponding alkyne compounds. Particularly preferred are polymerizable compounds including an allyl ether group, vinyl carbonate group and alkyne group.

A polyfunctional polymerizable compound contains two, three or more polymerizable groups, preferably free radical polymerizable groups selected from the group consisting of an acrylate, a methacrylate, an acrylamide, a methacrylamide, a styrene group, a maleate, a fumarate, an itaconate, a vinyl ether, a vinyl ester, an allyl ether and an allyl ester.

In a preferred embodiment, the polyfunctional polymerizable compound is a duofunctional acrylate containing two polymerizable groups, namely two acrylate groups.

Preferred polyfunctional acrylates include triethylene glycol diacrylate, tetraethylene glycol diacrylate, polyethylene glycol diacrylate, dipropylene glycol diacrylate, tripropylene glycol diacrylate, polypropylene glycol diacrylate, 1,4-butanediol diacrylate, 1,6-hexanediol diacrylate, 1,9-nonanediol diacrylate, neopentyl glycol diacrylate, dimethyloltricyclodecane diacrylate, bisphenol A EO (ethylene oxide) adduct diacrylate, bisphenol A PO (propylene oxide) adduct diacrylate, hydroxypivalate neopentyl glycol diacrylate, propoxylated neopentyl glycol diacrylate, alkoxylated dimethyloltricyclodecane diacrylate and polytetramethylene glycol diacrylate, trimethylolpropane triacrylate, EO modified trimethylolpropane triacrylate, tri (propylene glycol) triacrylate, caprolactone modified trimethylolpropane triacrylate, pentaerythritol triacrylate, pentaerythritol tetraacrylate, pentaerythritolethoxy tetraacrylate, dipentaerythritol hexaacrylate, ditrimethylolpropane tetraacrylate, glycerolpropoxy triacrylate, and caprolactam modified dipentaerythritol hexaacrylate Other suitable difunctional acrylates include alkoxylated cyclohexanone dimethanol diacrylate, alkoxylated hexanediol diacrylate, dioxane glycol diacrylate, dioxane glycol diacrylate, cyclohexanone dimethanol diacrylate, diethylene glycol diacrylate and neopentyl glycol diacrylate.

Other polyfunctional acrylates include propoxylated glycerine triacrylate and propoxylated trimethylolpropane triacrylate, di-trimethylolpropane tetraacrylate, dipentaerythritol pentaacrylate, ethoxylated pentaerythritol tetraacrylate, methoxylated glycol acrylates and acrylate esters Preferred polyfunctional acrylates include dipropylene glycol diacrylate, tripropylene glycol diacrylate, 1,6-hexanediol diacrylate, cyclohexanone dimethanol diacrylate, polyethyleneglycol 200 diacrylate, 3-methyl 1,5-pentanediol diacrylate, pentaerythritol tetraacrylate, trimethylolpropane triacrylate and dipentaerythritol pentaacrylate.

The polyfunctional polymerizable compound may have two different polymerizable groups, such as a vinylether group and an acrylate group. Preferred vinylether acrylates are those disclosed in U.S. Pat. No. 6,310,115 (AGFA). A particularly preferred compound is 2-(2'-vinyloxyethoxy) ethyl acrylate (VEEA). Other suitable vinylether acrylates are those disclosed in columns 3 and 4 of U.S. 67/679,890 B (NIPPON SHOKUBAI).

Instead of difunctional or polyfunctional acrylates, also their methacrylate analogues may be used.

For certain applications preferably no polyfunctional (meth)acrylates are employed. For example, when the substrate is a textile that is worn directly on the human skin it may give rise to skin sensitization.

A preferred alternative free radical curing chemistry is the so-called thiol-ene and thiol-yne chemistry. In such a chemistry, a combination of at least one polyfunctional thiol compound and at least one polyfunctional polymerizable compound is used. The polyfunctional polymerizable compound is a polyfunctional monomers or oligomer having a plurality of polymerizable groups selected from a group consisting of a vinyl group, an acrylamide group, a methacrylamide group, a vinyl carbonate group, a vinyl ether group, a vinyl ester group, a vinyl carbamate group, an allyl ether groups, an allyl ester group and an alkyne group. Particularly preferred are polymerizable compounds including allyl ether groups, vinyl carbonate groups and alkyne groups.

Synthesis of such monomers is disclosed in the relevant literature, for example in HURD, Charles D. Vinylation and the Formation of Acylals. *Journal Am. Chem. Soc.* 1956, vol. 78, no. 1, p. 104_106; LOBELL, M., et al. Synthesis of hydroxycarboxylic acid vinyl esters. *MP Synthesis*. 1994, vol. 4, p. 375-377; LEE, T. Y., et al. Synthesis, Initiation, and Polymerization of Photoinitiating Monomer. *Macromolecules*. 2005, vol. 38, no. 18, p. 7529-7531; ATTA, A. M., et al. New vinyl ester resins based on rosin for coating applications. *React. Funct. Polym.* 2006, vol. 66, p. 1596-1608.; WO 01/00634 A (WRIGHT CHEM CORP); and ROHR, Markus, et al. Solvent-free ruthenium-catalysed vinylcarbamate synthesis from phenylacetylene and diethylamine in 'supercritical' carbon dioxide. *Green Chemistry*. 2001, vol. 3, p. 123-125.

Preferred polymerizable oligomers and polymers are urethanes, polyesters, polyethers, polycarbonates, poly-carbamates, polyureas and straight-chain oligomers having the following polymerizable groups: acrylate, methacrylate, vinyl, acrylamide, methacrylamide, vinyl carbonate, vinyl ether, vinylester-vinyl carbamate groups, as well as their corresponding alkyne compounds.

Particularly preferred monomers are selected from the group consisting of di- or oligofunctional allylethers, di- or oligofunctional allyl esters, di- or oligofunctional vinyl ethers, di- or oligofunctional vinyl esters and di- or oligofunctional norbornene derivatives. Typical allyl ethers can be selected from pentaerythritol tetraallyl ether, glycerol triallyl ether, 1,6-hexane diol diallyl ether, cyclohexane dimethanol diallyl ether, trimethylolpropane triallyl ether, dipentaerythritol hexaallyl ether and ethoxylated and propoxylated derivatives thereof. Typical vinylethers can be selected from pentaerythritol tetravinyl ether, glycerol trivinyl ether, 1,6-hexane diol divinyl ether, cyclohexane dimethanol divinyl ether, trimethylolpropane trivinyl ether, dipentaerythritol hexavinyl ether and ethoxylated and propoxylated derivatives thereof. Typical allyl esters can be selected from adipic acid diallyl ester, terephthalic acid diallyl ester, trimellitic acid triallyl ester, pyromellitic acid tetraallyl ester, citric acid triallyl ester and glutaric acid diallyl ester. Typical vinyl esters can be selected from adipic acid divinyl ester, terephthalic acid divinyl ester, trimellitic acid trivinyl ester, pyromellitic acid tetravinyl ester, citric acid trivinyl ester and glutaric acid divinyl ester.

Colorants

The UV curable inkjet ink may contain a colorant. The colorants may be dyes, pigments or a combination thereof. Organic and/or inorganic pigments may be used. The colorant is preferably a pigment or a polymeric dye, most preferably an organic colour pigment. Organic colour pigments generally allow to obtain a much broader colour gamut.

The pigments may be black, white, cyan, magenta, yellow, red, orange, violet, blue, green, brown, mixtures thereof, and the like. This colour pigment may be chosen from those disclosed by HERBST, Willy, et al. Industrial Organic Pigments, Production, Properties, Applications. 3rd edition. Wiley—VCH, 2004. ISBN 3527305769.

A preferred pigment for a cyan inkjet ink a beta-copper phthalocyanine pigment, with C.I. Pigment Blue 15:3 or 15:4 being particularly preferred.

For a red inkjet ink, preferably a pigment is selected from the group consisting of C.I. Pigment Red 57/1, C.I. Pigment Red 122, C.I. Pigment Red 170, C.I. Pigment Red 175, C.I. Pigment Red 176, C.I. Pigment Red 187, C.I. Pigment Red 188, C.I. Pigment Red 207, C.I. Pigment Red 242, C.I. Pigment Red 254, C.I. Pigment Red 272 and mixed crystals thereof;

The pigment in a yellow UV curable inkjet ink is preferably selected from C.I. Pigment Yellow 74 C.I. Pigment Yellow 83, C.I. Pigment Yellow 97, C.I. Pigment Yellow 110, C.I. Pigment Yellow 120, C.I. Pigment Yellow 138, C.I. Pigment Yellow 150, C.I. Pigment Yellow 151, C.I. Pigment Yellow 154, C.I. Pigment Yellow 155, C.I. Pigment Yellow 175, C.I. Pigment Yellow 180, C.I. Pigment Yellow 181, C.I. Pigment Yellow 194, C.I. Pigment Yellow 213, C.I. Pigment Yellow 214 and mixed crystals thereof;

Particular preferred violet pigments are C.I. Pigment Violet 19, 23, 32, and 37.

Particular preferred orange pigments are C.I. Pigment Orange 5, 13, 16, 34, 40, 43, 59, 66, 67, 69, 71 and 73.

Particular preferred green pigments are C.I. Pigment Green 7 and 36.

Particular preferred pigments are C.I. Pigment Brown 6 and 7.

In a black UV curable inkjet ink, the pigment is preferably a carbon black pigment. Suitable black pigments include carbon blacks such as Pigment Black 7 (e.g. Carbon Black MA8® from MITSUBISHI CHEMICAL), Regal® 400R, Mogul® L, Elftex® 320 from CABOT Co., or Carbon Black FW18, Special Black 250, Special Black 350, Special Black 550, Printex® 25, Printex® 35, Printex® 55, Printex® 90, Printex® 150T from DEGUSSA. In a preferred embodiment, the carbon black pigment used is a pigment having less than 0.15% of toluene-extractable fraction using the method as described in section III, paragraph 5 of the Resolution AP(89) 1 dated 13 Sep. 1989 published by the Council of Europe.

It is also possible to include mixtures of pigments in the inkjet ink. For example, in some inkjet ink application a neutral black inkjet ink is preferred and can be obtained e.g. by mixing a black pigment and a cyan pigment into the ink. Also pigments may be combined to enlarge the colour gamut of an ink set. The inkjet ink set may also include one or more spot colours. Silver and gold are often desired colours for making a product more attractive by giving it an exclusive appearance.

Suitable pigments include mixed crystals of the above particular preferred pigments. Mixed crystals are also referred to as solid solutions. For example, under certain conditions different quinacridones mix with each other to form solid solutions, which are quite different from both physical mixtures of the compounds and from the compounds themselves. In a solid solution, the molecules of the components enter into the same crystal lattice, usually, but not always, that of one of the components. The x-ray diffraction pattern of the resulting crystalline solid is characteristic of that solid and can be clearly differentiated from the pattern of a physical mixture of the same components in the same proportion. In such physical mixtures, the x-ray pattern of each of the components can be distinguished, and the disappearance of many of these lines is one of the criteria of the formation of solid solutions. A commercially available example is Cinquasia™ Magenta RT-355-D from BASF AG.

Pigment particles in inkjet ink should be sufficiently small to permit free flow of the ink through the inkjet-printing device, especially at the ejecting nozzles. It is also desirable to use small particles for maximum colour strength and to slow down sedimentation.

The numeric average pigment particle size is preferably between 0.050 and 1 µm, more preferably between 0.070 and 0.300 µm and particularly preferably between 0.080 and 0.200 µm. Most preferably, the numeric average pigment particle size is no larger than 0.150 µm. An average particle size smaller than 0.050 µm is less desirable for decreased light-fastness, but mainly also because very small pigment particles or individual pigment molecules thereof may still be extracted in food packaging applications.

The numeric average pigment particle size of pigment particles is best determined with a Brookhaven Instruments Particle Sizer BI90plus based upon the principle of dynamic light scattering. The ink is then diluted, for example, with ethyl acetate to a pigment concentration of 0.002 wt %. The measurement settings of the BI90plus are: 5 runs at 23° C., angle of 90°, wavelength of 635 nm and graphics=correction function.

In the case of a white inkjet ink, preferably a pigment with a refractive index greater than 1.60, preferably greater than 2.00, more preferably greater than 2.50 and most preferably greater than 2.60 is used. The white pigments may be employed singly or in combination.

Preferably titanium dioxide is used for the pigment with a refractive index greater than 1.60. Titanium oxide occurs in the crystalline forms of anatase type, rutile type and brookite type. The anatase type has a relatively low density and is easily ground into fine particles, while the rutile type has a relatively high refractive index, exhibiting a high covering power. Either one of these is usable in this invention. It is preferred to make the most possible use of characteristics and to make selections according to the use thereof. The use of the anatase type having a low density and a small particle size can achieve superior dispersion stability, ink storage stability and ejectability. At least two different crystalline forms may be used in combination. The combined use of the anatase type and the rutile type which exhibits a high colouring power can reduce the total amount of titanium oxide, leading to improved storage stability and ejection performance of ink.

For surface treatment of the titanium oxide, an aqueous treatment or a gas phase treatment may be applied, and an alumina-silica treating agent is usually employed. Alumina treated- or alumina-silica treated-titanium oxide are employable, preferably in combination with an organic surface treatment.

The numeric average particle diameter of the titanium oxide or other white pigments is preferably from 50 to 500 nm, more preferably from 150 to 400 nm, and most preferably from 200 to 350 nm. Sufficient hiding power cannot be obtained when the average diameter is less than 50 nm, and the storage ability and the jet-out suitability of the ink tend to be degraded when the average diameter exceeds 500 nm. The determination of the numeric average particle diameter is best performed by photon correlation spectroscopy at a wavelength of 633 nm with a 4 mW HeNe laser on a diluted sample of the pigmented inkjet ink. A suitable particle size analyzer used was a Malvern™ nano-S available from Goffin-Meyvis. A sample may be prepared by addition of one drop of ink to a cuvette containing 1.5 mL ethyl acetate and mixing it until a homogenous sample is obtained. The measured particle size is the average value of 3 consecutive measurements consisting of 6 runs of 20 seconds.

Generally, pigments are stabilized in the dispersion medium by dispersing agents, such as polymeric dispersants or surfactants. However, the surface of the pigments can be modified to obtain so-called "self-dispersible" or "self-dispersing" pigments, i.e. pigments that are dispersible in the dispersion medium without dispersants.

The pigment is preferably used in a concentrated pigment dispersion used for preparing inkjet inks in an amount of 10 to 40 wt %, more preferably an amount of 15 to 30 wt % based on the total weight of the pigment dispersion.

In a coloured inkjet ink the pigment is preferably present in an amount of 0.1 to 13.0 wt %. A dark colour inkjet ink preferably contains 1.5 to 13.0 wt %, more preferably 1.8 to 6.0 wt % of colour pigment based on the total weight of the inkjet ink, while a light colour inkjet ink preferably contains 0.1 to 1.3 wt %, more preferably 0.3 to 1.2 wt % of colour pigment based on the total weight of the inkjet ink.

A white inkjet ink preferably contains more than 13.0 wt %, more preferably 15.0 to 25.0 wt % of a white pigment based on the total weight of the inkjet ink.

Dispersants

The UV curable inkjet ink may also contain a dispersant in order to further improve pigment dispersion properties. Examples of the dispersant include, but are not particularly limited to polymeric dispersants.

Typical polymeric dispersants are copolymers of two monomers but may contain three, four, five or even more monomers. The properties of polymeric dispersants depend on both the nature of the monomers and their distribution in the polymer. Copolymeric dispersants preferably have the following polymer compositions:

statistically polymerized monomers (e.g. monomers A and B polymerized into ABBAABAB);
alternating polymerized monomers (e.g. monomers A and B polymerized into ABABABAB);
gradient (tapered) polymerized monomers (e.g. monomers A and B polymerized into AAABAABBABBB);
block copolymers (e.g. monomers A and B polymerized into AAAAABBBBBB) wherein the block length of each of the blocks (2, 3, 4, 5 or even more) is important for the dispersion capability of the polymeric dispersant;
graft copolymers (graft copolymers consist of a polymeric backbone with polymeric side chains attached to the backbone); and
mixed forms of these polymers, e.g. blocky gradient copolymers.

The polymeric dispersant has preferably a number average molecular weight Mn between 500 and 30000, more preferably between 1500 and 10000.

The polymeric dispersant has preferably a weight average molecular weight Mw smaller than 100,000, more preferably smaller than 50,000 and most preferably smaller than 30,000.

The polymeric dispersant has preferably a polydispersity PD smaller than 2, more preferably smaller than 1.75 and most preferably smaller than 1.5.

Commercial examples of polymeric dispersants are the following:
- DISPERBYK™ dispersants available from BYK CHEMIE GMBH;
- SOLSPERSE™ dispersants available from LUBRIZOL;
- TEGO™ DISPERS™ dispersants from EVONIK;
- EDAPLAN™ dispersants from MUNZING CHEMIE;
- ETHACRYL™ dispersants from LYONDELL;
- GANEX™ dispersants from ISP;
- DISPEX™ and EFKA™ dispersants from BASF;
- DISPONER™ dispersants from DEUCHEM.

Particularly preferred polymeric dispersants include Solsperse™ dispersants from LUBRIZOL, Efka™ dispersants from BASF, Disperbyk™ dispersants from BYK CHEMIE GMBH, and Ajisper™ dispersants from AJINOMOTO FINE-TECHNO Co. Particularly preferred dispersants are Solsperse™ 32000, 35000 and 39000 dispersants from LUBRIZOL.

The dispersants may be used alone or in combination of two or more kinds thereof.

The polymeric dispersant is preferably used in an amount of 2 to 600 wt %, more preferably 5 to 200 wt %, most preferably 50 to 90 wt % based on the weight of the pigment.

Dispersion Synergists

A dispersion synergist usually consists of an anionic part and a cationic part. The anionic part of the dispersion synergist exhibiting a certain molecular similarity with the colour pigment and the cationic part of the dispersion synergist consists of one or more protons and/or cations to compensate the charge of the anionic part of the dispersion synergist.

The dispersion synergist is preferably added in a smaller amount than the polymeric dispersant(s). The ratio of polymeric dispersant/dispersion synergist depends upon the pigment and should be determined experimentally. Typically, the ratio of wt % polymeric dispersant/wt % dispersion synergist is selected between 2:1 to 100:1, preferably between 2:1 and 20:1.

Suitable dispersion synergists that are commercially available include Solsperse™ 5000 and Solsperse™ 22000 from LUBRIZOL.

Particular preferred pigments for the magenta ink used are a diketopyrrolo-pyrrole pigment or a quinacridone pigment. Suitable dispersion synergists include those disclosed in EP 1790698 A (AGFA GRAPHICS), EP 1790696 A (AGFA GRAPHICS), WO 2007/060255 (AGFA GRAPHICS) and EP 1790695 A (AGFA GRAPHICS).

In dispersing C.I. Pigment Blue 15:3, the use of a sulfonated Cu-phthalocyanine dispersion synergist, e.g. Solsperse™ 5000 from LUBRIZOL is preferred. Suitable dispersion synergists for yellow inkjet inks include those disclosed in EP 1790697 A (AGFA GRAPHICS).

Polymerization Inhibitors

The UV curable inkjet ink may also contain a polymerization inhibitor. Due to the fact that an ink contains the polymerization inhibitor, a polymerization reaction before curing can be prevented.

Suitable polymerization inhibitors include phenol type antioxidants, hindered amine light stabilizers, phosphor type antioxidants, benzoquinone, hydroquinone and derivatives, such as hydroquinone monomethyl ether commonly used in (meth)acrylate monomers.

Examples of the phenolic polymerization inhibitor include, but are not limited to the following substances, p-methoxy phenol, cresol, t-butyl catechol, di-t-butyl-p-cresol, hydroquinone monomethylether, α-naphthol, 3,5-di-t-butyl-4-hydroxytoluene, 2,6-di-t-butyl-4-methylphenol, 2,2'-methylene-bis(4-methyl-6-t-butylphenol), 2,2'-methylene-bis(4-ethyl-6-butylphenol), and 4,4'-thio-bis(3-methyl-6-t-butylphenol) and pyrogallol.

Suitable commercial inhibitors are, for example, Sumilizer™ GA-80, Sumilizer™ GM and Sumilizer™ GS produced by Sumitomo Chemical Co. Ltd.; Genorad™ 16, Genorad™ 18 and Genorad™ 20 from Rahn AG; Irgastab™ UV10 and Irgastab™ UV22, Tinuvin™ 460 and CGS20 from Ciba Specialty Chemicals; Floorstab™ UV range (UV-1, UV-2, UV-5 and UV-8) from Kromachem Ltd, Additol™ S range (S100, 5110, S120 and S130) from Cytec Surface Specialties.

A preferred polymerization inhibitor is Irgastab™ UV10 from BASF. Other examples of polymerization inhibitor include TEMPO, TEMPOL, and Al cupferron.

The polymerization inhibitors may be used alone or in combination of two or more kinds thereof.

In a preferred embodiment, the polymerization inhibitor is a mixture of different types of polymerization inhibitors. Preferred polymerization inhibitors are mixtures of an oxyl free radical-based polymerization inhibitor, a phenol-based polymerization inhibitor, and an amine-based polymerization inhibitor. Suitable examples are given in EP 2851402 A (FUJIFILM).

The polymerization inhibitor is preferably added at 200 to 20,000 ppm relative to the total amount of the inkjet ink.

Surfactants

The UV curable inkjet ink may contain at least one surfactant for improving the spreading of the inkjet ink. The surfactant can be anionic, cationic, non-ionic, or zwitterionic and is preferably added in a total quantity less than 3 wt % based on the total weight of the ink and particularly preferably in a total less than 1.5 wt % based on the total weight of the UV curable inkjet ink to prevent foaming of the ink in its container. The content of the surfactant is preferably 0.05 to 1.5 wt %, more preferably 0.10 to 1.0 wt % based on the total weight of the UV curable inkjet ink.

Preferred surfactants are selected from fluoro surfactants (such as fluorinated hydrocarbons) and silicone surfactants. The silicone surfactants are preferably siloxanes and can be alkoxylated, polyester modified, polyether modified, polyether modified hydroxy functional, amine modified, epoxy modified and other modifications or combinations thereof. Preferred siloxanes are polymeric, for example polydimethylsiloxanes.

Preferred commercial silicone surfactants include BYK™ 333 and BYK™ UV3510 from BYK Chemie.

In a preferred embodiment, the surfactant is a polymerizable compound.

Preferred polymerizable silicone surfactants include a (meth)acrylated silicone surfactant. Most preferably the (meth)acrylated silicone surfactant is an acrylated silicone surfactant, because acrylates are more reactive than methacrylates.

In a preferred embodiment, the (meth)acrylated silicone surfactant is a polyether modified (meth)acrylated polydimethylsiloxane or a polyester modified (meth)acrylated polydimethylsiloxane.

Preferred commercially available (meth)acrylated silicone surfactants include: Ebecryl™ 350, a silicone diacrylate from Cytec; the polyether modified acrylated polydimethylsiloxane BYK™ UV3500 and BYK™ UV3530, the polyester modified acrylated polydimethylsiloxane BYK™ UV3570, all manufactured by BYK Chemie; Tego™ Rad 2100, Tego™ Rad 2200N, Tego™ Rad 2250N, Tego™ Rad 2300, Tego™ Rad 2500, Tego™ Rad 2600, and Tego™ Rad 2700, Tego™ RC711 from EVONIK; Silaplane™ FM7711, Silaplane™ FM7721, Silaplane™ FM7731, Silaplane™ FM0711, Silaplane™ FM0721, Silaplane™ FM0725, Silaplane™ TM0701, Silaplane™ TM0701T all manufactured by CHISSO Corporation; and DMS-R05, DMS-R11, DMS-R18, DMS-R22, DMS-R31, DMS-U21, DBE-U22, SIB1400, RMS-044, RMS-033, RMS-083, UMS-182, UMS-992, UCS-052, RTT-1011 and UTT-1012 all manufactured by GELEST Inc.

Preparation of UV Curable Inkjet Inks

The average particle size and distribution of a pigment is an important feature for inkjet inks. The inkjet ink may be prepared by precipitating or milling the pigment in the dispersion medium in the presence of the dispersant.

Mixing apparatuses may include a pressure kneader, an open kneader, a planetary mixer, a dissolver, and a Dalton Universal Mixer. Suitable milling and dispersion apparatuses are a ball mill, a pearl mill, a colloid mill, a high-speed disperser, double rollers, a bead mill, a paint conditioner, and triple rollers. The dispersions may also be prepared using ultrasonic energy.

Many different types of materials may be used as milling media, such as glasses, ceramics, metals, and plastics. In a preferred embodiment, the grinding media can comprise particles, preferably substantially spherical in shape, e.g. beads consisting essentially of a polymeric resin or yttrium stabilized zirconium oxide beads.

In the process of mixing, milling and dispersion, each process is performed with cooling to prevent build-up of heat, and as much as possible under light conditions in which actinic radiation has been substantially excluded.

The inkjet ink may contain more than one pigment, and may be prepared using separate dispersions for each pigment, or alternatively several pigments may be mixed and co-milled in preparing the dispersion.

The dispersion process can be carried out in a continuous, batch or semi-batch mode.

The preferred amounts and ratios of the ingredients of the mill grind will vary widely depending upon the specific materials and the intended applications. The contents of the milling mixture comprise the mill grind and the milling media. The mill grind comprises pigment, polymeric dispersant and a liquid carrier. For inkjet inks, the pigment is usually present in the mill grind at 1 to 50 wt %, excluding the milling media. The weight ratio of pigment over polymeric dispersant is 20:1 to 1:2.

The milling time can vary widely and depends upon the pigment, mechanical means and residence conditions selected, the initial and desired final particle size, etc. In the present invention pigment dispersions with an average particle size of less than 100 nm may be prepared.

After milling is completed, the milling media is separated from the milled particulate product (in either a dry or liquid dispersion form) using conventional separation techniques, such as by filtration, sieving through a mesh screen, and the like. Often the sieve is built into the mill, e.g. for a bead mill. The milled pigment concentrate is preferably separated from the milling media by filtration.

In general, it is desirable to make inkjet inks in the form of a concentrated mill grind, which is subsequently diluted to the appropriate concentration for use in the inkjet printing system. This technique permits preparation of a greater quantity of pigmented ink from the equipment. By dilution, the inkjet ink is adjusted to the desired viscosity, surface tension, colour, hue, saturation density, and print area coverage for the particular application.

Inkjet Printing Methods

An inkjet printing method including the steps of:
a) jetting a UV curable inkjet ink as described above on a substrate; and
b) UV curing the jetted UV curable inkjet ink using UV LEDs having an emitting wavelength between 365 nm and 400 nm.

The UV curable inkjet inks are jetted by one or more print heads ejecting small droplets in a controlled manner through nozzles onto a substrate moving relative to the print head(s).

A preferred print head for the inkjet printing system is a piezoelectric head. Piezoelectric inkjet printing is based on the movement of a piezoelectric ceramic transducer when a voltage is applied thereto. The application of a voltage changes the shape of the piezoelectric ceramic transducer in the print head creating a void, which is then filled with inkjet ink or liquid. When the voltage is again removed, the ceramic expands to its original shape, ejecting a drop of ink from the print head.

A preferred piezoelectric print head is a so called push mode type piezoelectric print head, which has a rather large piezo-element capable of ejecting also high viscous inkjet ink droplets. Such a print head is available from RICOH as the GEN5s print head.

A preferred piezoelectric print head is a so-called through-flow piezoelectric drop-on-demand print head. Such a print head is available from TOSHIBA TEC as the CF1ou print head. Through-flow print heads are preferred because they enhance the reliability of inkjet printing.

The inkjet print head normally scans back and forth in a transversal direction across the moving ink-receiver surface. Often the inkjet print head does not print on the way back. Bi-directional printing is preferred for obtaining a high areal throughput.

Another preferred printing method is by a "single pass printing process", which can be performed by using page wide inkjet print heads or multiple staggered inkjet print heads which cover the entire width of the ink-receiver surface. In a single pass printing process, the inkjet print heads usually remain stationary and the ink-receiver surface is transported under the inkjet print heads.

In a particularly preferred embodiment, the inkjet printing of the UV curable inkjet inks is performed in a multi-pass printing mode. Multi-pass printing is a technique used to reduce banding in ink-jet printing. Dots of ink, when still in liquid form, tend to run together due to surface tension. This is referred to as coalescence. To print a high quality image, it is important to print individual round dots. But to achieve full saturated colours, the dots must overlap to completely cover the substrate. By only printing a portion of the image data so as to avoid simultaneously printing adjacent dots during each printing cycle, coalescence may be largely avoided. Additionally, by avoiding all horizontal adjacencies, the transverse speed of the printing mechanism can be increased up to two times the rated print speed of the print head. In a preferred embodiment, the number of passes used is to 2 to 6 passes, more preferably no more than 4 passes.

An advantage of using a multi-pass printing mode is that the UV curable inkjet inks are cured in consecutive passes, rather than in a single pass which requires a curing device with higher UV output. The print head lifetime is also larger for multi pass printing. While in single pass printing one side shooter is sufficient to replace the whole print head, in multi pass printing side shooters and even nozzle failings can be tolerated and also compensated for. Also the cost of a multi-pass printer is usually much lower, especially for wide format substrates.

Curing

The radiation curable inkjet inks are cured by ultraviolet radiation.

In the present invention, the UV curing device includes UV LEDs having an emitting wavelength between 365 nm and 400 nm, preferably larger than 370 nm. Such UV LEDs are especially preferred in view of their long life-time and low energy consumption. The UV LEDs may be combined with other types of UV curing devices, but preferably only UV LEDs are used in the inkjet printing system.

The UV curing device may be arranged in combination with the print head of a multi-pass inkjet printer, travelling therewith so that the UV curable inkjet ink is exposed to curing radiation very shortly after been jetted.

The UV curing device may also be not to move with the print head, e.g. in a single pass inkjet printer, may also be an elongated radiation source extending transversely across the ink-receiver surface to be cured and adjacent the transverse path of the print head so that the subsequent rows of images formed by the print head are passed, stepwise or continually, beneath that radiation source.

UV radiation is generally classed as UV-A, UV-B, and UV-C as follows:
UV-A: 400 nm to 320 nm
UV-B: 320 nm to 290 nm
UV-C: 290 nm to 100 nm.

Any ultraviolet light source, as long as part of the emitted light can be absorbed by the photo-initiator or photo-initiator system, may be employed as a radiation source, such as, a high or low pressure mercury lamp, a cold cathode tube, a black light, an ultraviolet LED, an ultraviolet laser, and a flash light. Of these, the preferred source is one exhibiting a relatively long wavelength UV-contribution having a dominant wavelength of 300-400 nm. Specifically, a UV-A light source is preferred due to the reduced light scattering therewith resulting in more efficient interior curing.

Furthermore, it is possible to cure the image using, consecutively or simultaneously, two light sources of differing wavelength or illuminance. For example, the first UV-source can be selected to be rich in UV-C, in particular in the range of 260 nm-200 nm. The second UV-source can then be rich in UV-A, e.g. a gallium-doped lamp, or a different lamp high in both UV-A and UV-B. The use of two UV-sources has been found to have advantages e.g. a fast curing speed and a high curing degree.

For facilitating curing, the inkjet printer may include one or more oxygen depletion units. The oxygen depletion units place a blanket of nitrogen or other relatively inert gas (e.g. $CO_2$), with adjustable position and adjustable inert gas concentration, in order to reduce the oxygen concentration in the curing environment. Residual oxygen levels are usually maintained as low as 200 ppm, but are generally in the range of 200 ppm to 1200 ppm.

Substrates

There is no real limitation on the type of substrate for inkjet printing the UV curable inkjet ink of the invention on. The substrates may have ceramic, metallic, glass, wood, paper or polymeric surfaces for printing. The substrate may also be primed.

The substrate may be a porous substrate, such as e.g. textile, paper and card board substrates, or a substantially non-absorbing substrate such as e.g. a plastic substrate having a polyethylene terephthalate surface.

The substrate may also be pre-treated, e.g. by corona, plasma or flame treatment.

Preferred substrates including surfaces of polyethylene, polypropylene, polycarbonate, polyvinyl chloride, polyesters like polyethylene terephthalate (PET), polyethylene naphthalate (PEN) and polylactide (PLA) and polyimide.

The substrate may also be a paper substrate, such as plain paper or resin coated paper, e.g. polyethylene or polypropylene coated paper. There is no real limitation on the type of paper and it includes newsprint paper, magazine paper, office paper, wallpaper but also paper of higher grammage, usually referred to as boards, such as white lined chipboard, corrugated board and packaging board.

The substrates may be transparent, translucent or opaque. Preferred opaque substrates includes so-called synthetic paper, like the Synaps™ grades from Agfa-Gevaert which are an opaque polyethylene terephthalate sheet having a density of 1.10 $g/cm^3$ or more.

There is no restriction on the shape of the substrate. It can be a flat sheet, such a paper sheet or a polymeric film or it can be a three dimensional object like e.g. a plastic coffee cup. The three dimensional object can also be a container like a bottle or a jerry-can for including e.g. oil, shampoo, insecticides, pesticides, solvents, paint thinner or other type of liquids.

In a preferred embodiment of the inkjet printing method, the substrate is selected from textile, glass, pharmaceutical and food packaging.

In another preferred embodiment of the inkjet printing method, the substrate is a rigid medium selected from rigid PVC, paperboard, corrugated and wood.

In a preferred embodiment of the inkjet printing method, the substrate is a substrate suitable for soft signage applications, such as banners, posters, POP/POS displays, indoor wall graphics, tradeshow displays, parasols, flags, outdoor advertising and backdrops.

A textile substrate is preferably selected from the group consisting of cotton textiles, silk textiles, flax textiles, jute textiles, hemp textiles, modal textiles, bamboo fibre textiles, pineapple fibre textiles, basalt fibre textiles, ramie textiles, polyester based textiles, acrylic based textiles, glass fibre textiles, aramid fibre textiles, polyurethane textiles (e.g. Spandex or Lycra™), Tyvek™ and mixtures thereof.

Suitable polyester textile includes polyethylene terephthalate textile, cation dyeable polyester textile, acetate textile, diacetate textile, triacetate textile, polylactic acid textile and the like.

Applications of these textiles include automotive textiles, canvas, banners, flags, interior decoration, clothing, hats, shoes, floor mats, doormats, brushes, mattresses, mattress covers, linings, sacking, stage curtains, flame-retardant and protective fabrics, and the like. Polyester fibre is used in all types of clothing, either alone or blended with fibres such as cotton. Aramid fibre (e.g. Twaron) is used for flame-retardant clothing, cut-protection, and armour. Acrylic is a fibre used to imitate wools.

The UV curable inkjet inks of the invention are also very suitable for inkjet printing on leather, especially on natural leather.

Manufacturing Methods of Indoor Decorative Articles

A method of manufacturing indoor decorative articles includes the steps of: a) inkjet printing one or more UV curable inkjet inks according to the invention as described above on a substrate; and b) UV curing the one or more UV curable inkjet inks using UV LEDs having an emission wave length larger than 360 nm, preferably larger than 370 nm.

In a preferred embodiment of the manufacturing method, the indoor decorative article is selected from the group consisting of decorative panels, furniture, wallpaper, doors, leather articles and textile fabrics.

Indoor Decorative Articles

An indoor decorative article including a cured layer of one or more UV curable inkjet inks according to the present invention is preferably selected from the group consisting of decorative panels, furniture, wallpaper, doors leather articles, and textile fabrics.

The decorative panels may be simple panels, such as a glass or metal panel, but may also be decorative laminate panels selected from the group consisting of flooring panels, ceiling panels and wall panels. Decorative laminate panels are made by inkjet printing on a décor paper or a thermoplastic substrate which is then heat pressed together with at least a protective layer into a decorative laminate.

The thermoplastic substrate is preferably based on a material selected from the group consisting of polyvinylchloride (PVC), polypropylene (PP), polyethylene (PE), polyethylene-terephthalate (PET) and thermoplastic polyurethane (TPU) and combinations thereof. Decorative laminates based on PVC are also known in the market as LVT (Luxury Vinyl Tile).

The décor paper is impregnated by a thermosetting resin, like a melamin based thermosetting resin, before heat pressing. Such decorative laminate panels are known as wood based decorative laminate panels.

The UV curable inkjet ink of the invention can also be advantageously used for other inkjet applications than manufacturing indoor decorative articles, and especially for inkjet printing on packaging for food, cosmetics and pharma.

The term "packaging for food, cosmetics or pharma" should be understood in its broadest meaning as also encompassing a packaging of a substance intended for human or animal intake or administration. Food may be solid or liquid, for example, it encompasses also drinks like beer, soda, milk, vegetable oil, yoghourt and the like. There is also no limitation on the shape of the packaging for food, cosmetics or pharma. For example, food packaging may come in the shape of a cup, a bottle, a pouch, a box, a can, a carton, a wrapper and the like. Cosmetics encompass different solid or liquid products for cosmetical reasons that, for example, can be administered to human hair, such as a shampoo. Pharma packaging includes, for example, blister packaging, plastic bottles, pouches and bags for intravenous (IV) therapy.

Of course, for reasons of food safety and health, the composition of the radiation curable inkjet inks is preferably adapted to a so-called low migration ink composition.

In a preferred embodiment, the UV curable inkjet ink includes a monomer having at least one acrylate group and at least one ethylenically unsaturated polymerizable group selected from the group consisting of allylether, allylester, allylcarbonate, vinyl ether, vinylester, vinylcarbonate, fumarate, and maleate. Preferred examples of such monomers are disclosed in EP 2053103 A (AGFA).

The UV curable inkjet ink most preferably includes a vinylether acrylate monomer, such as VEEA available from Nippon Shokubai. In a preferred embodiment, the vinylether (meth)acrylate monomer is present in the UV curable inkjet ink in an amount of 20 wt % to 90 wt %, more preferably 25 wt % to 80 wt % and most preferably 30 wt % to 70 wt %, all based upon the total weight of the UV curable inkjet ink.

In a particularly preferred embodiment, the polymerizable composition of the UV curable inkjet ink consists essentially of: a) 25-100 wt % of one or more polymerizable compounds A having at least one acrylate group and at least one vinyl ether group; b) 0-55 wt % of one or more polymerizable compounds B selected from the group consisting of monofunctional acrylates and difunctional acrylates; and c) 0-55 wt % of one or more polymerizable compounds C selected from the group consisting of trifunctional acrylates, tetrafunctional acrylates, pentafunctional acrylates and hexafunctional acrylates, preferably with the proviso that if the weight percentage of compounds B>24 wt %, then the weight percentage of compounds C>1 wt %; and wherein all weight percentages of A, B and C are based upon the total weight of the polymerizable composition.

EXAMPLES

Materials

All materials used in the examples were readily available from standard sources such as Sigma-Aldrich (Belgium) and Acros (Belgium) unless otherwise specified. The water used is demineralized water.

Jeffamine™ EDR148 is a polyetheramine available from HUNTSMAN and represented by formula:

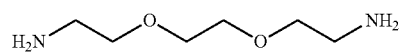

Jeffamine™ D400 is a polyetheramine with average molecular weight of about 430 available from HUNTSMAN and represented by formula:

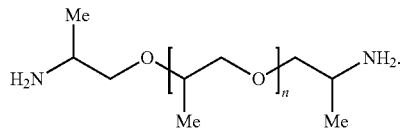

Jeffamine™ T-403 is a polyetheramine available from HUNTSMAN and represented by formula:

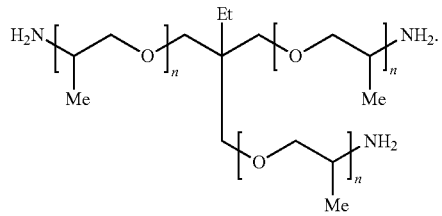

EDPP is ethyl 2-(3-diphenylphosphorylcarbonyl-2,4,6-trimethyl-anilino)-2-oxo-acetate and was synthesized in three steps as follows:

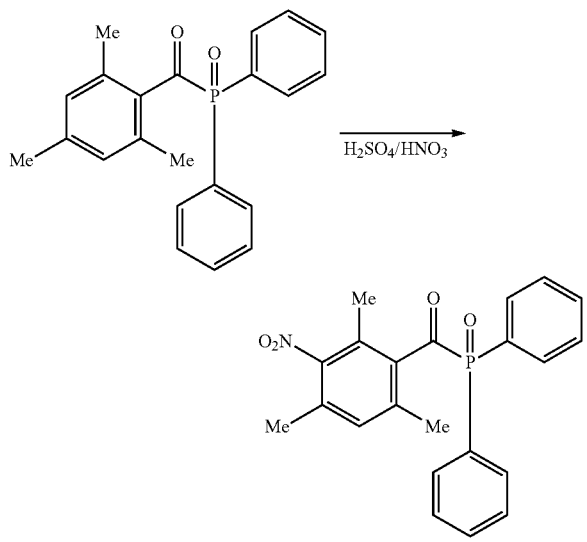

348.4 g (1 mol) (2,4,6-trimethylbenzoyl)diphenylphosphine oxide was added to 4847 g of a 65% HNO$_3$ solution while stirring. 337 g concentrated sulfuric acid was added dropwise over five and a half hours, while maintaining the reaction temperature below 32° C. The reaction was allowed to continue at room temperature for 20 hours. 1250 ml methylene chloride was added and the mixture was stirred for 10 minutes. The methylene chloride fraction was isolated an extracted twice with 2000 ml of a 10 w % solution of K$_2$HPO$_4$ in water. The methylene chloride fraction was isolated and extracted with 1250 ml brine. The methylene chloride fraction was isolated, dried over MgSO$_4$ and evaporated under reduced pressure. 500 ml n.-hexane was added and diphenylphosphoryl-(2,4,6-trimethyl-3-nitro-phenyl) methanone precipitated as pale yellow crystals. Diphenylphosphoryl-(2,4,6-trimethyl-3-nitro-phenyl) methanone was isolated by filtration and dried. 368 g (yield: 93%) of diphenylphosphoryl-(2,4,6-trimethyl-3-nitro-phenyl) methanone was isolated. (TLC analysis on TLC Silica Gel 60 F$_{254}$ supplied by Merck, eluent methylene chloride/ethyl acetate, R$_f$=0.69).

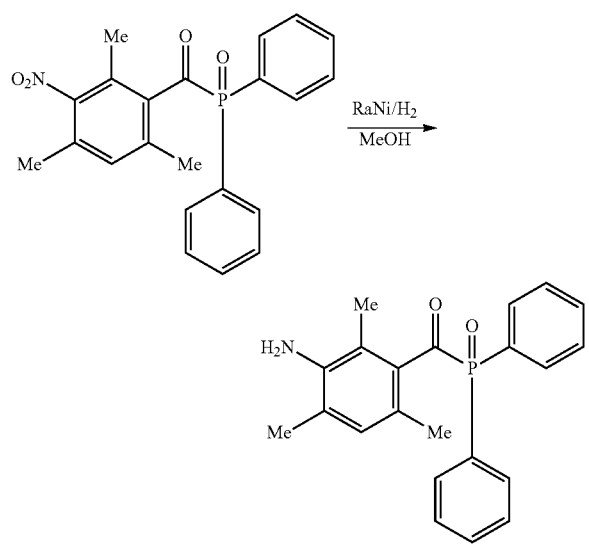

123 g (0.31 mol) diphenylphosphoryl-(2,4,6-trimethyl-3-nitro-phenyl) methanone was dissolved in 1400 ml methanol. 6 g RaNi was washed three times with methanol and added to the solution and diphenylphosphoryl-(2,4,6-trimethyl-3-nitro-phenyl) methanone was hydrogenated at 40° C. at 50 bar hydrogen pressure. The reaction was allowed to continue at 40° C. for 8 hours. The RaNi was removed by filtration and 1300 ml methanol was evaporated under reduced pressure. 1000 ml methyl t-butyl ether was added to crystallize (3-amino-2,4,6-trimethyl-phenyl)-diphenylphosphoryl methanone. (3-amino-2,4,6-trimethyl-phenyl)-diphenylphosphoryl methanone was isolated by filtration washed with methyl t-butyl ether and dried. 96 g (yield: 85%) (3-amino-2,4,6-trimethyl-phenyl)-diphenylphosphoryl-methanone was isolated (TLC analysis on REV C$_{18}$ plates, supplied by Büchi, eluent MeOH/1M NaCl 70/30: R$_f$: 0.2).

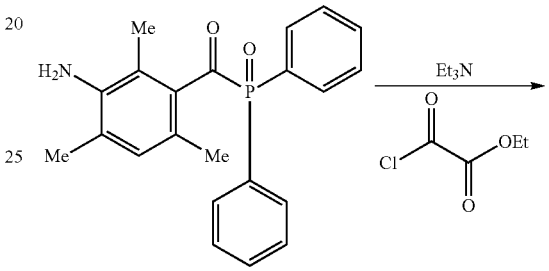

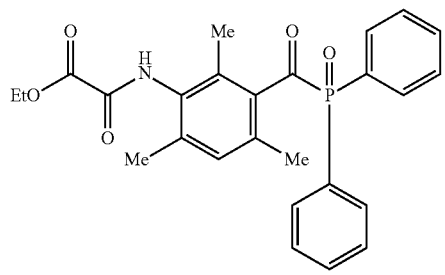

145.36 g (0.4 mol) (3-amino-2,4,6-trimethyl-phenyl)-diphenylphosphoryl methanone was dissolved in 600 ml methylene chloride. 40.89 g (0.4 mol) triethyl amine was added and the reaction mixture was cooled to −6.5° C. A solution of 61.24 g (0.44 mol) ethyl-oxalylchloride in 200 ml methylene chloride was added over one hour while keeping the reaction temperature below 0° C. The reaction was allowed to continue for two and a half hours, while the temperature gradually rose to 18° C. The precipitated triethyl amine hydrochloride was removed by filtration. The methylene chloride fraction was isolated and extracted with 1200 ml of a 20 wt % solution of K$_2$HPO$_4$ solution and 500 ml water. The methylene chloride fraction was isolated, dried over MgSO$_4$ and evaporated under reduced pressure to 300 ml. 1000 ml ethyl acetate was added to crystallize ethyl-2-(3-diphenylphosphorylcarbonyl-2,4,6-trimethyl-anilino)2-oxo-acetate (EDPP). EDPP was isolated by filtration, washed with ethyl acetate and dried. 168.4 g (yield: 91%) of EDPP was isolated (TLC analysis on TLC Silica Gel 60 F$_{254}$ supplied by Merck, eluent ethyl acetate/n.-hexane 70/30: R$_f$: 0.26).

APO-COMP-1 is an acylphosphine oxide initiator represented by formula:

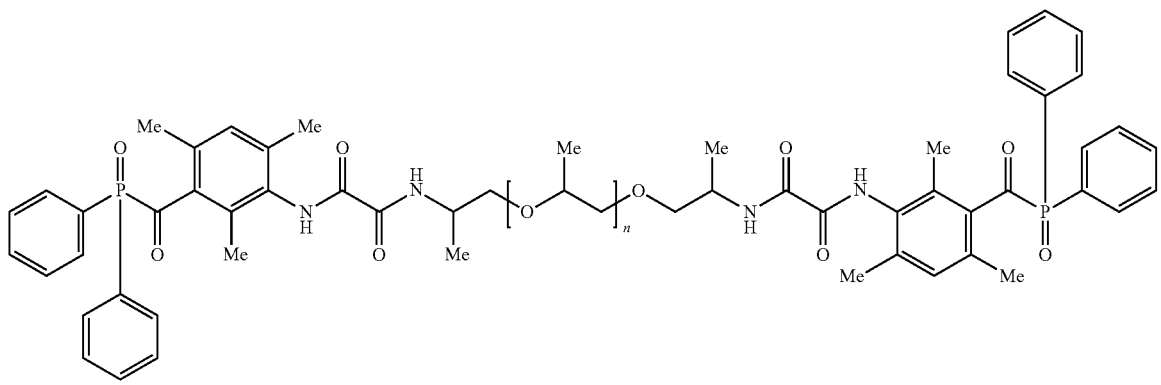

and was synthesized as follows:

2.50 g (5.4 mmol) EDPP was dissolved in 15 ml acetonitrile. 1.29 g Jeffamine™ D400 was added and the mixture was heated to reflux. The reaction was allowed to continue at reflux for 46 hours. After 46 hours, the solvent was removed by distillation and 0.13 g Jeffamine™ D400 in 2 ml acetonitrile was added. The reaction was allowed to continue at reflux for an additional 12 hours. The reaction mixture was allowed to cool down to room temperature. The residue was redissolved in 20 ml methylene chloride and the solvent was evaporated under reduced pressure. 2.7 g of APO-COMP-1 was isolated. The reaction was monitored by TLC chromatography until no EDPP was detectable anymore (TLC analysis on REV C18 plates supplied by Büchi, eluent: methanol/1 M NaCl 80/20).

APO-COMP-2 is initiator OXA-9, disclosed in WO 2019/243039 (AGFA), where n=1. APO-COMP-2 was synthesized as follows:

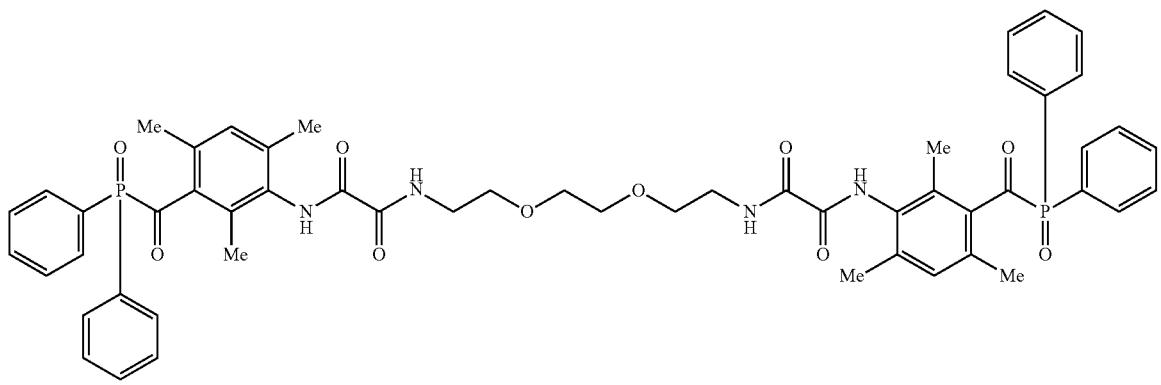 [SMILES: Cc1cc(C)c(C(=O)P(=O)(c2ccccc2)c2ccccc2)c(C)c1NC(=O)C(=O)NCCOCCOCCNC(=O)C(=O)Nc1c(C)cc(C)c(C(=O)P(=O)(c2ccccc2)c2ccccc2)c1C]

59.3 g (0.128 mol) EDPP was dissolved in 65 ml acetonitrile. 12.60 g Jeffamine™ EDR148 was added and the reaction mixture was heated to 76° C. The reaction was allowed to continue for 16 hours at 76° C. An additional 50 ml acetonitrile was added and the reaction mixture was allowed to cool down to room temperature. The solvent was removed under reduced pressure. 61.1 g of APO-COMP-2 was isolated. APO-COMP-2 was analyzed with TLC-MS (TLC analysis on REV $C_{18}$ plates supplied by Büchi, eluent: methanol/1 M NaCl 80/20, Rf: 0.25). A minor compound in the mixture was identified as the mono-acylated structure ($R_f$: 0.62).

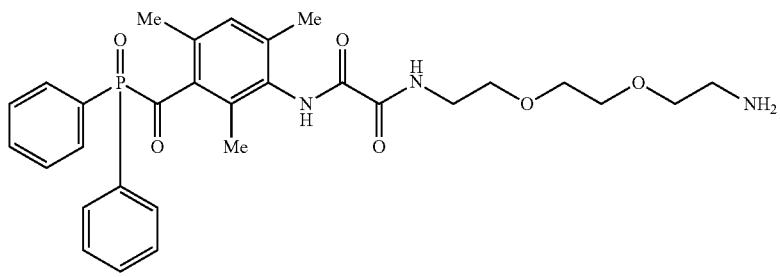 [SMILES: Cc1cc(C)c(C(=O)P(=O)(c2ccccc2)c2ccccc2)c(C)c1NC(=O)C(=O)NCCOCCOCCN]

APO-COMP-2 was used without further purification.

APO-COMP-3 is an acylphosphine oxide initiator represented by formula: and was synthesized as follows:

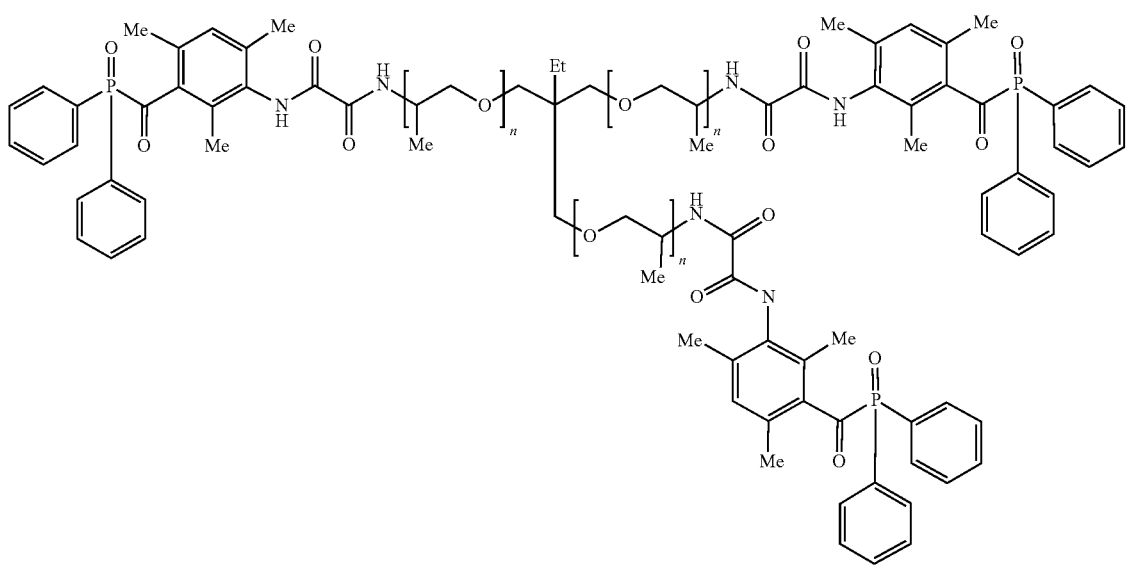

59.3 g (0.128 mol) EDPP was dissolved in 65 ml acetonitrile. 25.4 g Jeffamine™ T-403 was added and the mixture was heated to 76° C. The reaction was allowed to continue 22 hours at 76° C. The reaction mixture was allowed to cool down to 50° C. and the solvent was removed under reduced pressure. 71 g (yield: 85%) of APO-COMP-3 was isolated. The reaction was monitored by TLC chromatography until no EDPP was detectable anymore (TLC analysis on REV $C_{18}$ plates supplied by Büchi, eluent: methanol/1 M NaCl 80/20).

Thioxanthon-1 is a 50 wt % solution in VEEA of a polymerizable thioxanthone having the chemical structure TX-1:

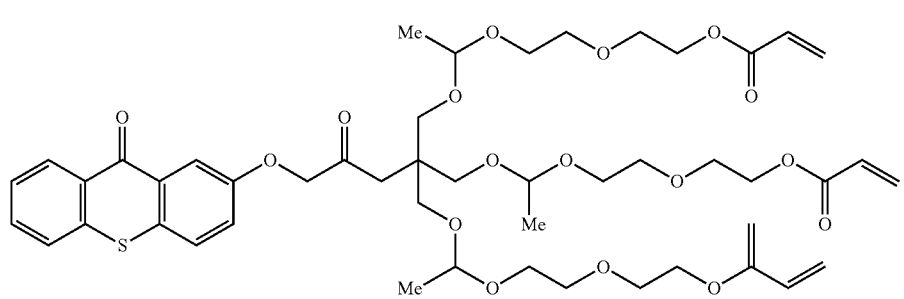

TX-1

Thioxanthon-1 was prepared according to Example 1 of EP 2684876 A (AGFA).

BHT is butylated hydroxytoluene.

VEEA is 2-(2'-vinyloxyethoxy)ethyl acrylate, a difunctional monomer available from NIPPON SHOKUBAI, Japan.

PETA is pentaerythritol tetra-acrylate available as Sartomer™ 295 from ARKEMA.

DPGDA is dipropyleneglycoldiacrylate available as Laromer™ DPGDA from BASF.

CYAN is a copper phtalocyanine pigment (PB15:4), supplied by Sun Chemical Corporation as SUNFAST BLUE 15:4.

YELLOW is a PY150, supplied by BASF as Cromophtal Yellow D1085.

MAGENTA is a PV19, supplied by Clariant as Inkjet Magenta ESB02.

D162 is a solvent free version of Disperbyk 162, supplied by BYK Chemie GMBH, prepared by precipitation with iso-octane.

EFKA7701 is a polymeric dispersing agent supplied by BASF.

PET175 is a 175 μm thick unsubbed polyethylene terephthalate sheet available as Astera™ type UR1 75.344 from Agfa-Gevaert N.V.

INHIB is a mixture forming a polymerization inhibitor having a composition according to Table 2.

TABLE 2

| wt % of component: | INHIB |
|---|---|
| VEEA | 82.4 |
| p-methoxyphenol | 4.0 |
| Butylated hydroxytoluene (BHT) | 10.0 |
| Cupferron ™ Al | 3.6 |

Cupferron ™ Al is aluminum N-nitrosophenylhydroxylamne from WAKO Chemicals LTD.
BYK333 is a polyether-modified polydimethylsiloxane surfactant Byk ™-333 from BYK ALTANA GROUP.

Measurement Methods

1. TLC-MS Analysis:

The molecular mass was determined using TLC-MS, according to the following procedure. A TLC was run under circumstances given in the synthetic examples. The TLC was analyzed using a CAMAG™ TLC-MS interface coupled to an AmaZon™ SL mass spectrometer (supplied by Bruker Daltonics) via an Agilent™ 1100 HPLC pump. First a blank spectrum was taken by eluting a spot on the TLC plate where no compounds are present with a 0.01 molar solution of ammonium acetate in methanol. A second spectrum of the compound to be analyzed was taken by eluting the spot of the compound under consideration with a 0.01 molar solution of ammonium acetate in methanol. The first spectrum was subtracted from the second spectrum, giving the spectrum of the compound to be analyzed.

2. Surface Cure

The surface cure was evaluated by wiping with a Q-tip and was scored from K0 to K5, where K0 no visual damage on the surface to K5, which shows a complete removal of the coating. K3 means clear surface damage of the coating, which remains tacky, with only partly removal of the coating from the surface of the substrate.

Example 1

This example illustrates the synthesis of acylphosphine oxide initiators according to the first embodiment wherein a diamine is used containing a primary amine and a tertiary amine.

Synthesis of N-[3-(dimethylamino)propyl]-N'-(3-diphenylphosphorylcarbonyl2,4,6-trimethyl-phenyl) oxamide (APO-3)

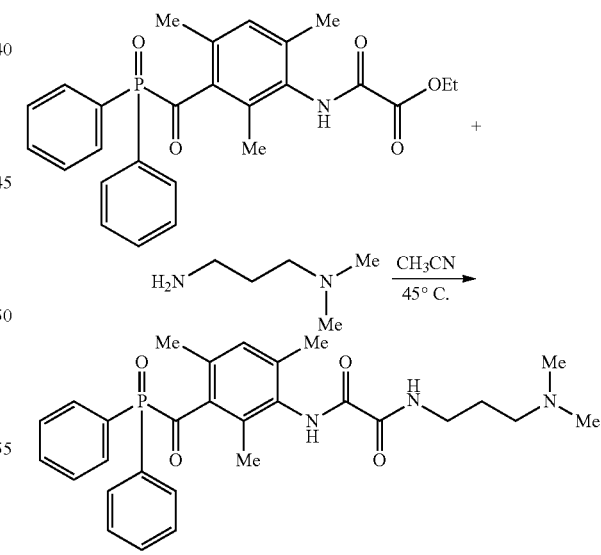

2.78 g (6 mmol) EDPP was dissolved in 15 ml acetonitrile. 0.619 g (6 mmol) 3-dimethylamino-propyl amine was added and the reaction mixture was heated to 43° C. The reaction was allowed to continue at 43° C. for 6 hours. The reaction mixture was allowed to cool down to room temperature and the solvent was removed under reduced pressure. 3 g (yield: 96%) of APO-3 was isolated (TLC analysis on REV C18 plates supplied by Büchi, eluent: methanol/1 M NaCl: 70/30, $R_f$: 0.32). The structure was confirmed by TLC-MS.

Example 2

This example illustrates the synthesis of acylphosphine oxide initiators according to the second embodiment wherein a diamine is used containing a primary amine and a secondary amine.

Synthesis of N'-(3-diphenylphosphorylcarbonyl-2,4,6-trimethyl-phenyl)N-[2-(ethylamino)ethyl]oxamide

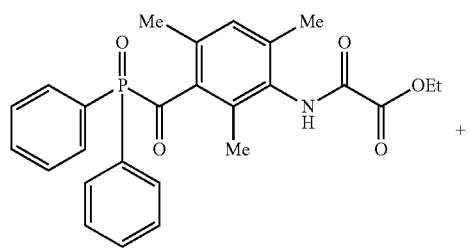

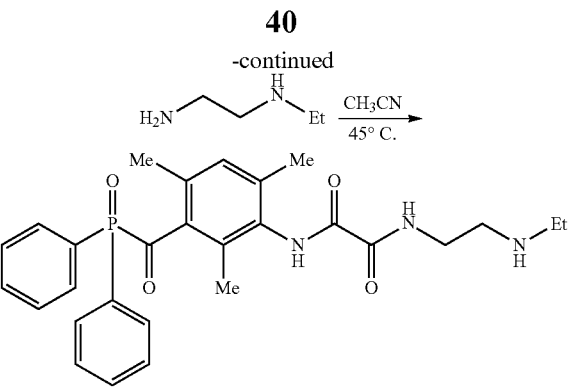

2.78 g (6 mmol) EDPP was dissolved in 15 ml acetonitrile. 0.534 g (6 mmol) N-ethyl-ethylene diamine was added and the reaction mixture was heated to 45° C. The reaction was allowed to continue for six and a half hours at 45° C. The reaction mixture was allowed to cool down to room temperature. A small precipitated residue was removed by filtration and the solvent was removed under reduced pressure. 2.8 g (yield: 92%) of N'-(3-diphenylphosphorylcarbonyl-2,4,6-trimethyl-phenyl)-N-[2-(ethylamino)ethyl]oxamide was isolated. (TLC analysis on REV C18 plates supplied by Büchi, eluent: methanol/1 M NaCl: 70/30, $R_f$: 0.42). The structure was confirmed by TLC-MS.

Synthesis of APO-1

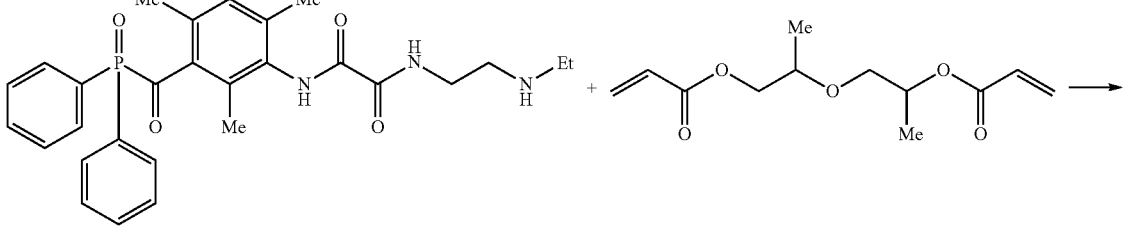

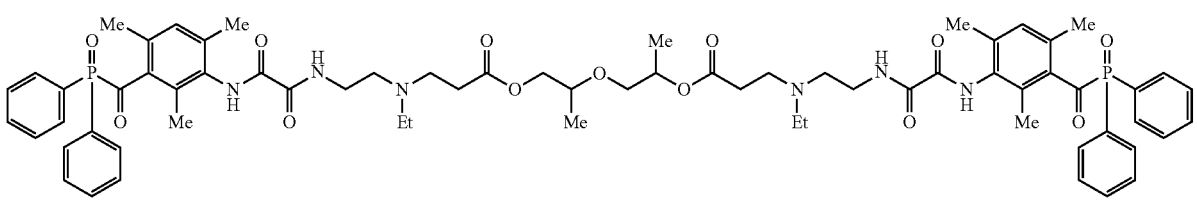

1 g (1.98 mmol) N'-(3-diphenylphosphorylcarbonyl-2,4,6-trimethyl-phenyl)-N-[2-(ethylamino)ethyl]oxamide was dissolved in 5 ml dimethyl acetamide. 5 mg BHT was added, followed by the addition of 0.252 g (1.04 mmol) DPGDA. The reaction mixture was heated to 85° C. and the reaction was allowed to continue for 43 hours at 85° C. The reaction mixture was allowed to cool down to room temperature and 25 ml water was added. The crude APO-1 precipitated as an oil. Water was removed and the residue was redissolved in 25 ml methylene chloride. The mixture was extracted twice with 25 ml water. The organic fraction was isolated, dried over $MgSO_4$ and evaporated under reduced pressure. 1.24 g of the crude APO-1 was isolated. The crude APO-1 was purified by preparative column chromatography on a Prochrom LC 80 column, using Kromasil C18 100A 10 μm as stationary phase and methanol/0.2 M ammonium acetate as eluent. 0.38 g of APO-1 was isolated (TLC analysis on REV C18 plates supplied by Büchi, eluent: methanol/1 M NaCl: 70/30, $R_f$: 0.2). The structure was confirmed by TLC-MS.

Synthesis of APO-2

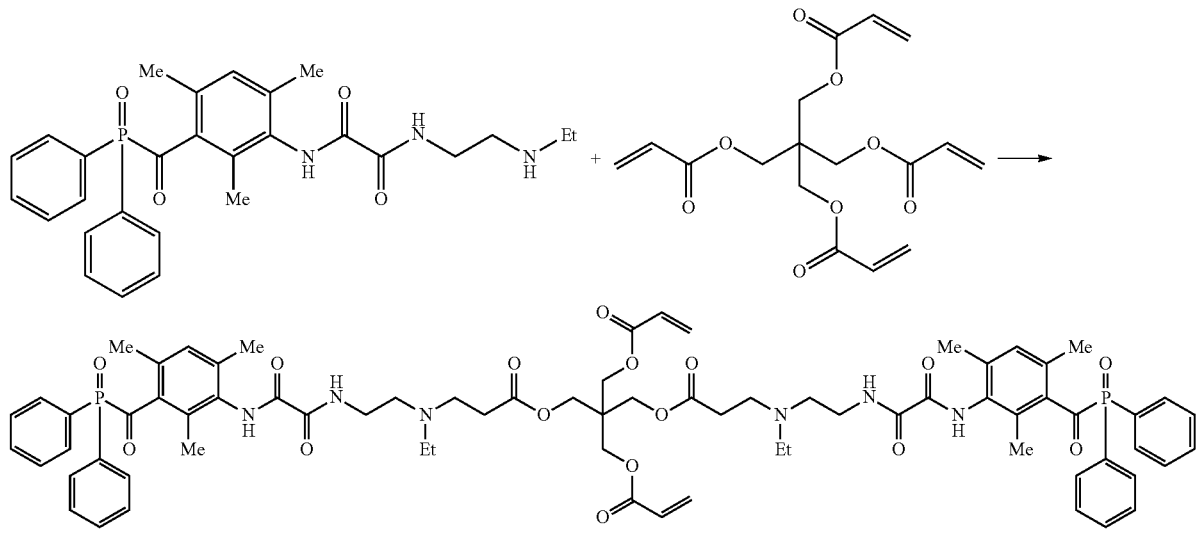

1.57 g (1.55 mmol) N'-(3-diphenylphosphorylcarbonyl2,4,6-trimethyl-phenyl)-N-[2-(ethylamino)ethyl]oxamide was dissolved in 5 ml dimethyl acetamide. 8 mg BHT was added followed by the addition of 0.505 g PETA. The reaction mixture was heated to 75° C. and the reaction was allowed to continue for 16 hours at 75° C. The reaction mixture was allowed to cool down to room temperature and poured into 25 ml water. The crude APO-1 precipitated as an oil. The aqueous phase was removed and the residue was dissolved in 25 ml methylene chloride. The organic fraction was extracted twice with 25 ml water. The organic fraction was isolated, dried over $MgSO_4$ and evaporated under reduced pressure. 1.62 g (yield: 74%) of APO-2 was isolated. The reaction was monitored with TLC chromatography until N'-(3-diphenylphosphorylcarbonyl2,4,6-trimethyl-phenyl)-N-[2-(ethylamino) ethyl]oxamide was no longer detectable (TLC analysis on REV C18 plates supplied by Büchi, eluent: methanol/1 M NaCl 70/30).

Example 3

Two difunctional photoinitiators APO-1 and APO-COMP-1 having a similar molecular weight and strong chemical resemblance are compared in this example for curing speed of a colourless UV curable inkjet ink.

Preparation of UV Curable Inkjet Inks

The inventive UV curable inkjet ink INV-1 and the UV curable inkjet ink COMP-1 were prepared according to Table 3. The weight % (wt %) are based on the total weight of the UV curable inkjet inks. Compounds APO-1 and APO-COMP-1 were present in equal molar amounts in the UV curable inkjet inks.

TABLE 3

| wt % of: | INV-1 | COMP-1 |
| --- | --- | --- |
| VEEA | 90.0 | 89.7 |
| APO-1 | 10.0 | — |
| APO-COMP-1 | — | 10.3 |

Evaluation and Results

The inventive UV curable inkjet ink INV-1 and comparative UV curable inkjet ink COMP-1 were coated on an unsubbed PET using a 20 μm wired bar. The UV curable inkjet inks were cured using a Fusion DRSE-120 conveyer equipped with 12 W 395 nm LED at a speed of 20 m/min. The number of passes needed to obtain a full surface cure were determined, with a maximum of 10 passes. The results are summarized in Table 4.

TABLE 4

| Cured sample | Number of passes | Surface cure |
| --- | --- | --- |
| INV-1 | 3 | K0 |
| COMP-1 | 10 | K3 |

From Table 4, it becomes apparent that the inventive UV curable inkjet ink exhibits a significantly improved surface cure when curing under ambient atmosphere.

Both UV curable inkjet inks were also evaluated by curing in the absence of oxygen (nitrogen blanket). In the absence of oxygen both UV curable inkjet inks were fully cured in one pass.

No bad smell was detected for the fully cured samples.

Example 4

This example illustrates the good curing properties of colourless UV curable inkjet inks in accordance with the invention.

Preparation of Radiation Curable Compositions

The inventive UV curable inkjet inks INV-2 and INV-3 and the comparative UV curable inkjet inks COMP-2 and COMP-3 were prepared according to Table 5. The weight % (wt %) are based on the total weight of the UV curable inkjet inks.

TABLE 5

| wt % of : | INV-2 | INV-3 | COMP-2 | COMP-3 |
|---|---|---|---|---|
| VEEA | 89.2 | 91.8 | 92.2 | 91.6 |
| APO-2 | 10.8 | — | — | — |
| APO-3 | — | 8.2 | — | — |
| APO-COMP-2 | — | — | 7.8 | — |
| APO-COMP-3 | — | — | — | 8.4 |

Evaluation and Results

The inventive radiation curable compositions INV-2 and INV-3 and comparative radiation curable composition COMP-2 and COMP-3 were coated on an unsubbed PET using a 20 μm wired bar. The radiation curable compositions were cured using a Fusion DRSE-120 conveyer equipped with 12 W 395 nm LED at a speed of 20 m/min. The number of passes needed to become a full surface cure were determined, with a maximum of 10 passes. The results are summarized in Table 6.

TABLE 6

| Sample | Number of passes | Surface cure |
|---|---|---|
| INV-2 | 4 | K0 |
| INV-3 | 4 | K0 |
| COMP-2 | 10 | K3 |
| COMP-3 | 10 | K4 |

From Table 6, it should be clear that only the photoinitiators according to the present invention give sufficient surface cure upon LED exposure. Formulations based on the comparative photoinitiators remained tacky even after 10 passes. No bad odor was observed for the samples INV-2 and INV-3.

Example 5

This example illustrates the efficiency in avoiding oxygen inhibition upon UV LED curing for a CMY inkjet ink set B wherein the inkjet inks are in accordance with the invention.

Preparation of Concentrated Pigment Dispersions

Preparation of the Cyan Pigment Dispersion DISP-C

A concentrated cyan pigment dispersion DISP-C was prepared having a composition according to Table 7.

TABLE 7

| wt % of component: | DISP-C |
|---|---|
| CYAN | 15 |
| EFKA 7701 | 10 |
| INHIB | 1 |
| VEEA | 37.5 |
| DPGDA | 36.5 |

A Dynomill™ ECM multilab, filled with 1.285 kg of 0.4 mm yttrium stabilized zirconia beads ("high wear resistant zirconia grinding media" from TOSOH Co.), was preloaded with 0.335 kg DPGDA.

0.317 kg DPGDA, 0.375 kg of a 40 wt % solution of EFKA7701 in DPGDA, 23 g of INHIB and 0.45 kg CYAN were mixed, using a DISPERLUX™ dispenser. Stirring was continued for 30 minutes. The vessel was connected to the Dynomill™ ECM multilab and milling was continued for two hours while circulating at 0.2 liter per minute and with a rotation speed of 10 m/s. After two hours 0.375 kg of a 40 wt % solution of EFKA7701 in DPGDA and 1.125 kg VEEA were added to the vessel and circulation was continued. During the milling process, the mill was cooled to keep the temperature below 60° C. After milling, the dispersion was charged into a vessel. The average particle size was 98 nm with a viscosity of 91 mPa·s.

Preparation of the Yellow Pigment Dispersion DISP-Y

A concentrated yellow pigment dispersion DISP-Y, was prepared having a composition according to Table 8.

TABLE 8

| wt % of component: | DISP-Y |
|---|---|
| YELLOW | 15 |
| D162 | 15 |
| INHIB | 1 |
| VEEA | 69 |

A Dynomill™ ECM AP2, filled with 4.788 kg of 0.4 mm yttrium stabilized zirconia beads ("high wear resistant zirconia grinding media" from TOSOH Co.), was preloaded with 2.49 kg VEEA.

0.15 kg VEEA, 3 kg of a 30 wt % solution of D162 in VEEA, 60 g of INHIB and 1.8 kg YELLOW were mixed, using a DISPERLUX™ dispenser. Stirring was continued for 30 minutes. The vessel was connected to the Dynomill™ ECM AP-2 and milling was continued for three hours while circulating at 2 liter per minute and with a rotation speed of 13 m/s. After three hours 3 kg of a 30 wt % solution of D162 in VEEA and 3 kg VEEA were added to the vessel and circulation was continued. During the milling process, the mill was cooled to keep the temperature below 60° C. After milling, the dispersion was charged into a vessel. The average particle size was 128 nm with a viscosity of 99 mPa·s.

Preparation of the Magenta Pigment Dispersion DISP-M

A concentrated magenta pigment dispersion DISP-M, was prepared having a composition according to Table 9.

TABLE 9

| wt % of component: | DISP-M |
|---|---|
| MAGENTA | 15 |
| EFKA 7701 | 10 |

TABLE 9-continued

| wt % of component: | DISP-M |
|---|---|
| INHIB | 1 |
| VEEA | 25 |
| DPGDA | 49 |

A Dynomill™ ECM AP2, filled with 4.788 kg of 0.4 mm yttrium stabilized zirconia beads ("high wear resistant zirconia grinding media" from TOSO Co.), was preloaded with 2.49 kg DPGDA.

4.14 kg DPGDA, 1.275 kg EFKA7701, 170 g of INHIB and 2.55 kg MAGENTA were mixed, using a DISPERLUX™ dispenser. Stirring was continued for 30 minutes. The vessel was connected to the Dynomill™ ECM AP-2 and milling was continued for four and a half hours while circulating at 2 liter per minute and with a rotation speed of 13 m/s. After two hours 0.425 kg EFKA7701, 4.25 kg VEEA and 1.7 kg DPGDA were added to the vessel and circulation was continued. During the milling process, the mill was cooled to keep the temperature below 60° C. After milling, the dispersion was charged into a vessel. The average particle size was 113 nm with a viscosity of 107 mPa·s.

Preparation Inkjet Ink Sets A and B

The comparative inkjet ink set A and the inventive inkjet inks set B were prepared by mixing the components in each ink according to Table 10. All weight percentages are based on the total weight of the inkjet ink.

TABLE 10

| wt % of component: | Inkjet Ink Set A | | | Inkjet Ink Set B | | |
|---|---|---|---|---|---|---|
|  | Ink C | Ink M | Ink Y | Ink C | Ink M | Ink Y |
| DISP-C | 20 |  |  | 20 |  |  |
| DISP-M |  | 20 |  |  | 20 |  |
| DISP-Y |  |  | 20 |  |  | 20 |
| APO-COMP2 | 10 | 10 | 10 |  |  |  |
| APO-1 |  |  |  | 10 | 10 | 10 |
| Thioxanthon-1 | 20 | 20 | 20 | 20 | 20 | 20 |
| VEEA | 49 | 49 | 49 | 49 | 49 | 49 |
| INHIB | 1 | 1 | 1 | 1 | 1 | 1 |

Evaluation and Results

Each inkjet ink was coated on PET175 using a 4 μm wired bar. The inks were then cured on a conveyer belt equipped with a 12 W 395 nm LED at a speed of 30 in/min. The number of passes required for a full surface cure was determined measured, with a maximum of 10 passes. The results are summarized in Table 11.

TABLE 11

| Inkjet Ink Set | Inkjet ink | Number of passes |
|---|---|---|
| A | C | 4 |
|  | M | 6 |
|  | Y | 4 |
| B | C | 1 |
|  | M | 2 |
|  | Y | 2 |

From Table 11, it becomes apparent that the inkjet inks of ink set B containing an acylphosphine oxide initiator in accordance with the invention have a high LED sensitivity, independent of the type of pigment. Also no bad smell was detected for images printed with ink set B.

Example 6

This example illustrates an inkjet printing method in accordance with the invention.

Preparation of the Inkjet Ink

The inkjet ink C-1 was prepared by mixing the components according to Table 12. All weight percentages are based on the total weight of the ink.

TABLE 12

| wt % of component: | Inkjet Ink C-1 |
|---|---|
| DISP-C | 20.0 |
| APO-1 | 10.0 |
| Thioxanthon-1 | 20.0 |
| VEEA | 48.9 |
| INHIB | 1.0 |
| BYK333 | 0.1 |

The inkjet ink C-1 was filtered over a 1.6 μm filter and the jettability was evaluated using a Dimatix™ DMP2831 system, equipped with a standard Dimatix™ 10 pl print head. The ink was jetted at 22 C, using a firing frequency of 5 kHz, a firing voltage of 25 V and a standard waveform. All nozzles started without the need for priming and kept on printing. A two by 10 cm patch was printed on an unsubbed 175 μm PET and cured using a conveyer belt at a speed of 30 m/min, equipped with a 12 W 395 nm LED. The ink spread well on the PET substrate and was fully cured after one pass.

The invention claimed is:

1. A UV curable inkjet ink including a free radical polymerizable compound and an acyl phosphine oxide initiator, wherein the acyl phosphine oxide initiator includes an acyl group selected from the group consisting of a benzoyl group substituted by an urea group or an oxalylamide group; a 2,6-dimethyl benzoyl group substituted in position 3 by an urea group or an oxalylamide group; a 2,6-dimethoxy benzoyl group substituted in position 3 by an urea group or an oxalylamide group; a 2,4,6-trimethyl benzoyl group substituted in position 3 by an urea group or an oxalylamide group; and a 2,4,6-trimethoxybenzoyl group substituted in position 3 by an urea group or an oxalylamide group, wherein the urea group and the oxalylamide group include a tertiary amine group positioning a phosphorus atom of the acylphosphine oxide initiator in a 1 to Z position, where position 1 is defined as that of the phosphorus atom and position Z is defined as the nitrogen atom of the tertiary amine group with Z representing an integer of at least 11; and wherein the acyl phosphine oxide initiator contains no more than two photoinitiating moieties having a phosphine oxide group.

2. The UV curable inkjet ink of claim 1, where position 1 is defined as that of the phosphorus atom and position Z is defined as the nitrogen atom of the tertiary amine group with Z representing an integer selected from 12 to 16.

3. The UV curable inkjet ink of claim 1, wherein the acyl phosphine oxide initiator is represented by formula I:

formula I

wherein

R₁ is a group according to formula II, with the dotted line representing the point of attachment to the phosphorus atom in formula I,

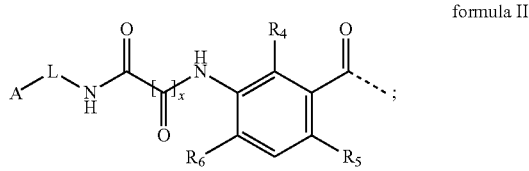

formula II

R₂ is selected from the group consisting of a substituted or unsubstituted aryl group, a substituted or unsubstituted heteroaryl group, and OR₇;

R₃ is selected from the group consisting of a substituted or unsubstituted aryl group, a substituted or unsubstituted heteroaryl group, and an acyl group;

R₄, R₅, and R₆ are independently selected from the group consisting of hydrogen, a methyl group, and a methoxy group;

R₇ is selected from the group consisting of hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group; and a substituted or unsubstituted aryl or heteroaryl group;

x is an integer having a value of 0 or 1;

L is a divalent linking group having no more than 5 carbon atoms; and

A is an aliphatic tertiary amine.

4. The UV curable inkjet ink of claim 3, wherein acyl group R₃ is a group R₁ according to formula II.

5. The UV curable inkjet ink of claim 3, wherein the aliphatic tertiary amine A is substituted by alkyl groups independently selected from methyl, ethyl, propyl, and butyl.

6. The UV curable inkjet ink of claim 1, wherein the acyl phosphine oxide initiator is represented by formula III:

wherein

R4, R5, and R6 are independently selected from the group consisting of hydrogen, a methyl group, and a methoxy group;

R8 is selected from the group consisting of a substituted or unsubstituted aryl group, a substituted or unsubstituted heteroaryl group, and OR12;

R9 is selected from the group consisting of a substituted or unsubstituted aryl group, a substituted or unsubstituted heteroaryl group, and an acyl group;

R10 is a substituted or unsubstituted alkyl group;

each R11 independently is selected from the group consisting of a hydrogen and a methyl group;

Y is selected from the group consisting of an oxygen and NR13;

R12 and R13 are each independently selected from the group consisting of hydrogen, a substituted or unsubstituted alkyl group, a substituted or unsubstituted alkenyl group, a substituted or unsubstituted alkynyl group, a substituted or unsubstituted aralkyl group, a substituted or unsubstituted alkaryl group, and a substituted or unsubstituted aryl or heteroaryl group;

L1 is a substituted or unsubstituted $C_2$ to $C_6$ alkylene group;

L2 is a divalent linking group comprising no more than 10 carbon atoms;

n is an integer 1 or 2;

m is an integer from 0 to 3; and

M is hydrogen if m=0; a covalent bond if n=m=1 or an n+m-valent moiety if n>1 and m>0.

7. The UV curable inkjet ink of claim 6, wherein R9 is an acyl group selected from the group consisting of a benzoyl group, a 2,6-dimethyl benzoyl group, a 2,6-dimethoxy benzoyl group, a 2,4,6-trimethyl benzoyl group, and a 2,4,6-trimethoxy benzoyl group.

8. The UV curable inkjet ink of claim 7, wherein the n+m-valent moiety M is an aliphatic moiety comprising 1 to 10 carbon atoms.

9. The UV curable inkjet ink of claim 1, wherein the acyl phosphine oxide initiator is selected from the group consisting of:

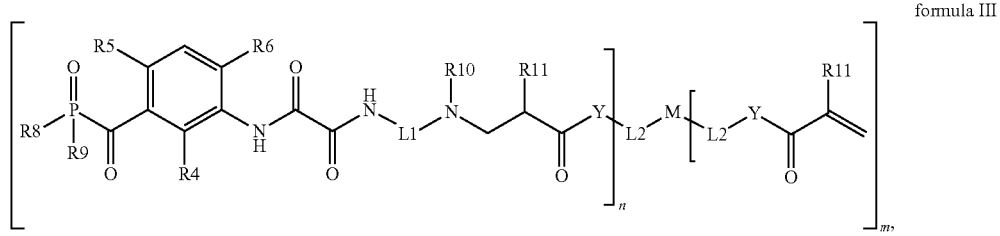

formula III

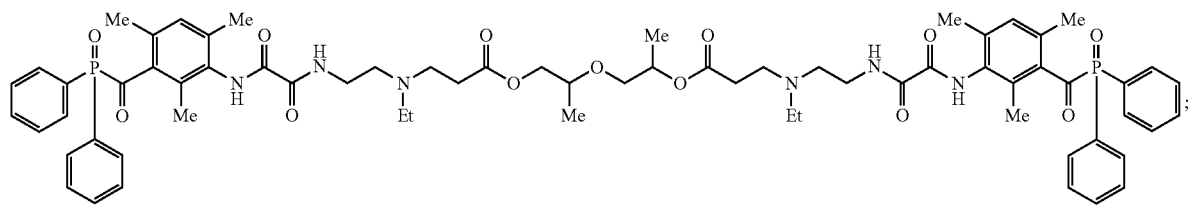
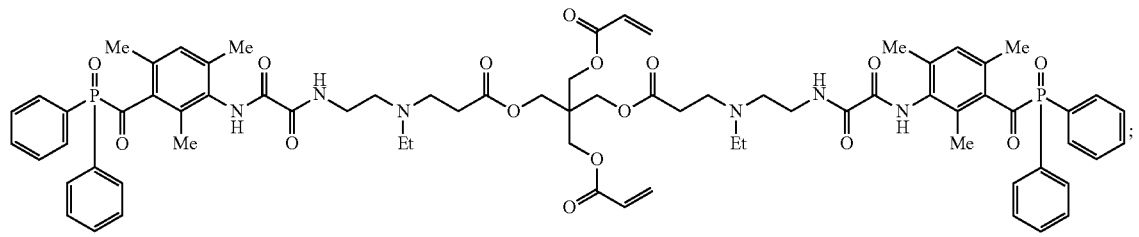
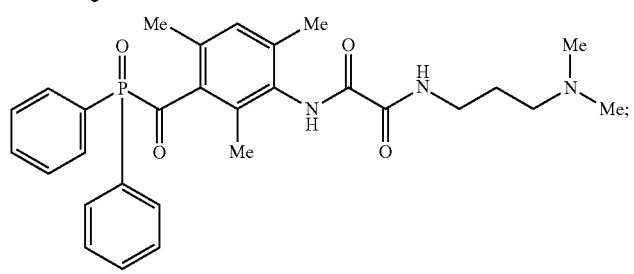
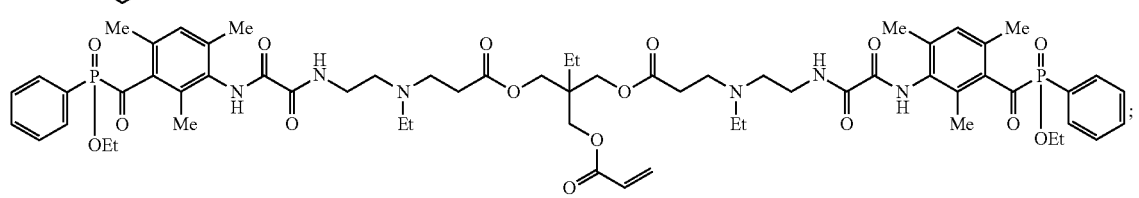
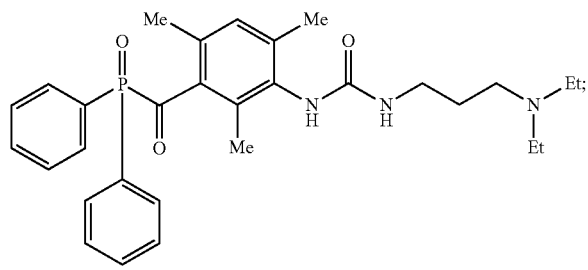
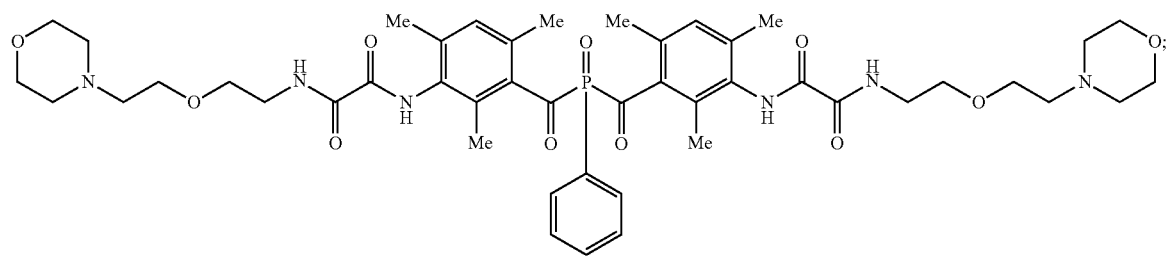
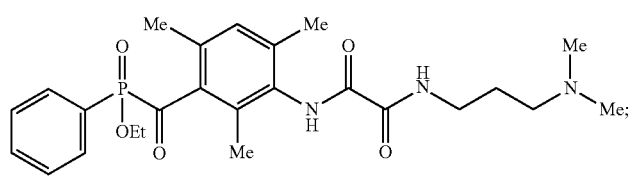

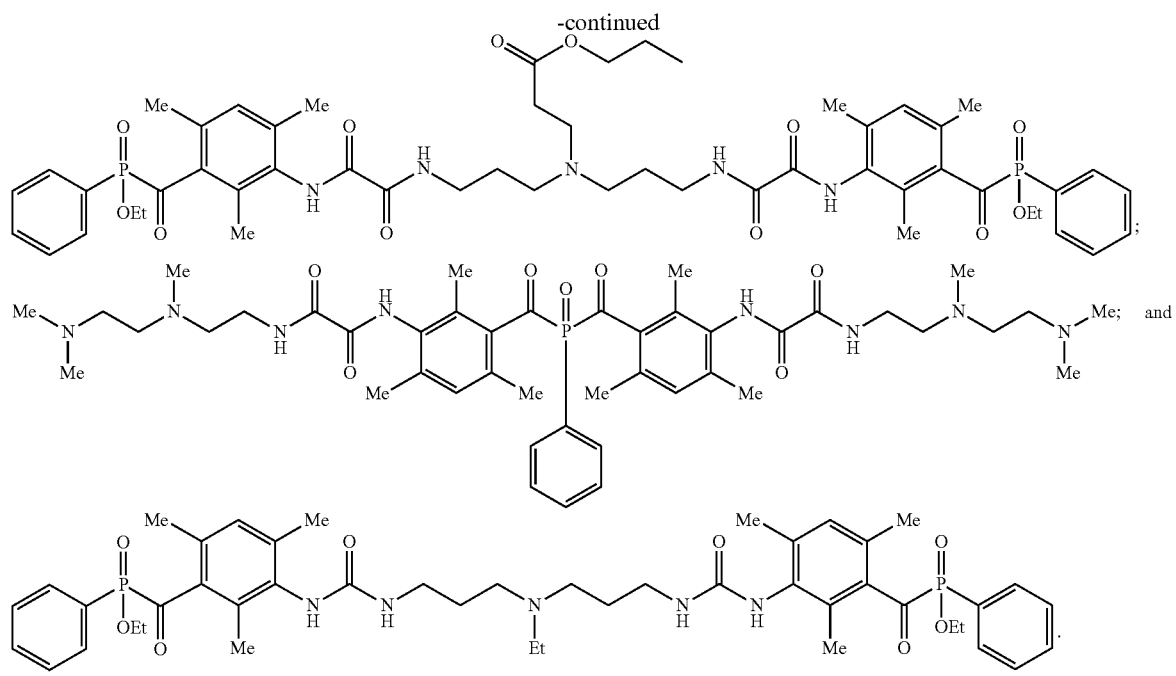

10. The UV curable inkjet ink of claim 1, wherein the acyl phosphine oxide initiator is a compound obtainable by the synthesis scheme:

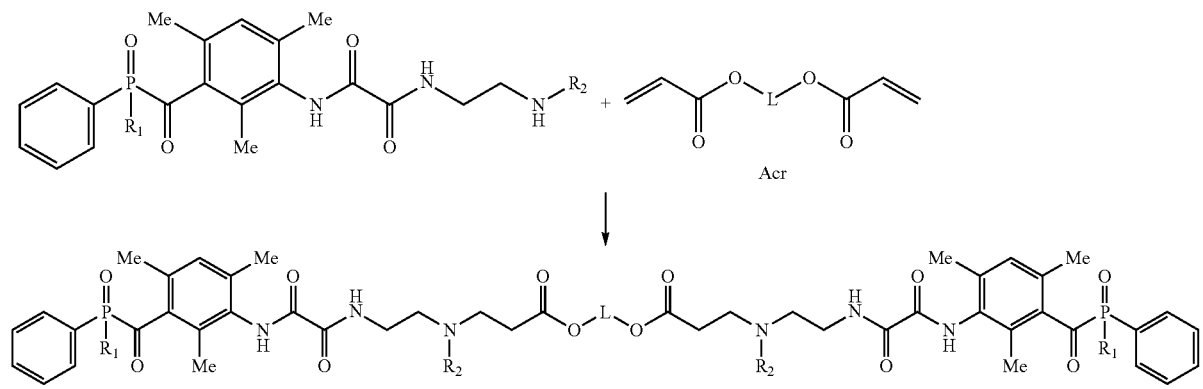

wherein $R_1$ is OEt or phenyl; $R_2$ is a $C_1$ to $C_8$ alkyl group; and L is a divalent linking group having no more than 20 carbon atoms being not further functionalized with acrylates; and wherein the difunctional acrylate Acr is selected from the compounds Acr-1 to Acr-15:

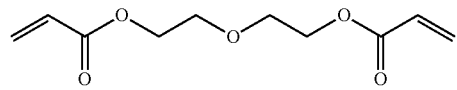

Acr-1

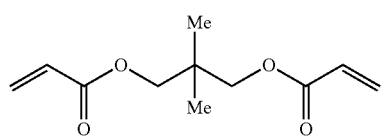

Acr-2

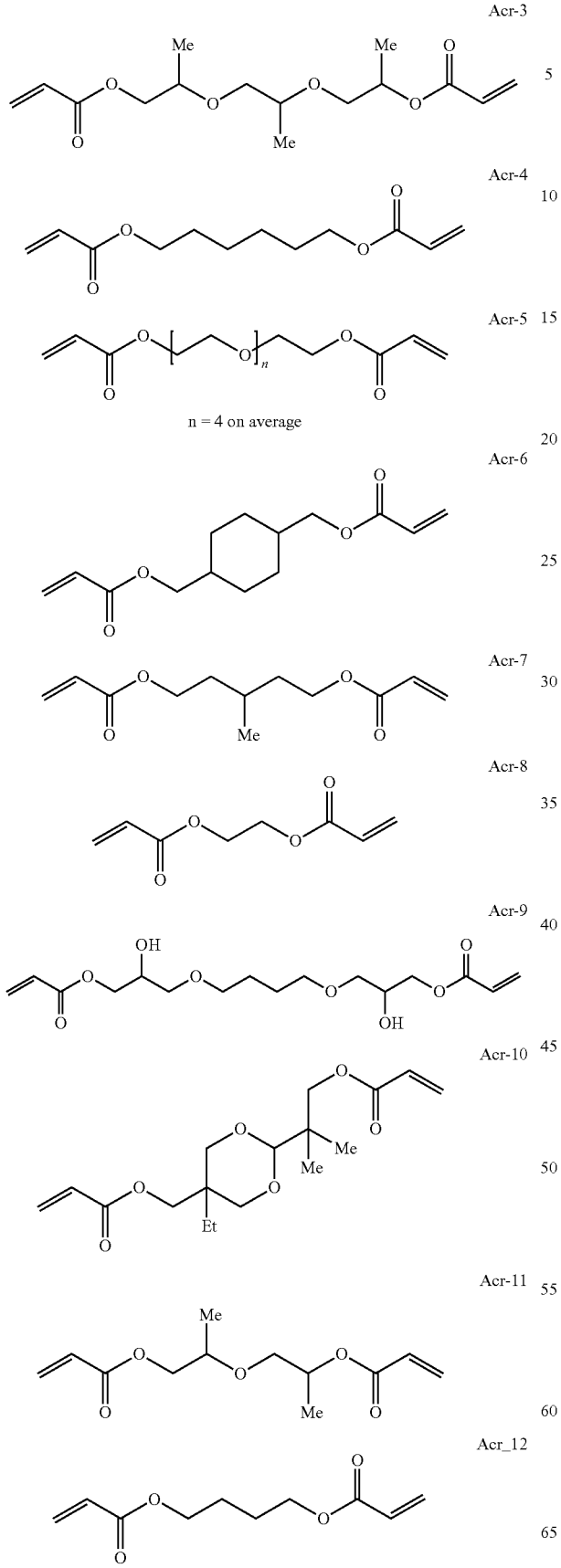

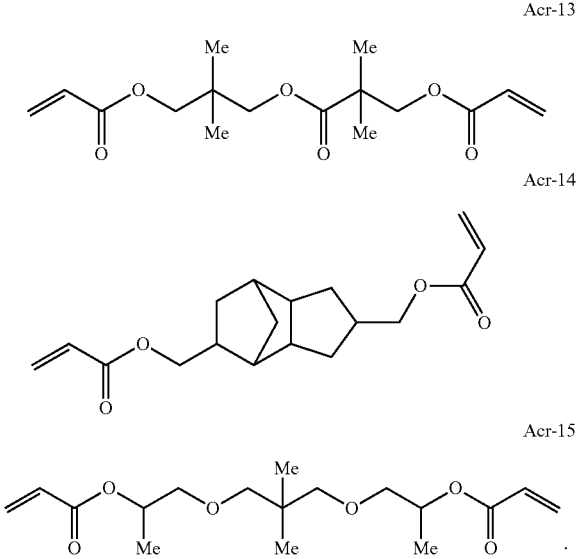

11. The UV curable inkjet ink of claim 10, wherein $R_2$ is a $C_1$ to an ethyl or a methyl group.

12. The UV curable inkjet ink of claim 1, further comprising a colour pigment.

13. The UV curable inkjet ink of claim 1, wherein the acyl phosphine oxide initiator is present in an amount between 1 and 25 wt % based on the total weight of the UV curable inkjet ink.

14. A UV curable inkjet ink set containing a plurality of UV curable inkjet inks as defined in claim 13.

15. The UV curable inkjet ink set of claim 14, wherein the ink set includes:
   a cyan UV curable inkjet ink containing a beta-copper phthalocyanine pigment;
   a red UV curable inkjet ink containing a pigment selected from the group consisting of C.I. Pigment Red 57/1, C.I. Pigment Red 122, C.I. Pigment Red 170, C.I. Pigment Red 175, C.I. Pigment Red 176, C.I. Pigment Red 187, C.I. Pigment Red 188, C.I. Pigment Red 207, C.I. Pigment Red 242, C.I. Pigment Red 254, C.I. Pigment Red 272, and mixed crystals thereof;
   a yellow UV curable inkjet ink containing a pigment selected from C.I. Pigment Yellow 74 C.I. Pigment Yellow 83, C.I. Pigment Yellow 97, C.I. Pigment Yellow 110, C.I. Pigment Yellow 120, C.I. Pigment Yellow 138, C.I. Pigment Yellow 150, C.I. Pigment Yellow 151, C.I. Pigment Yellow 154, C.I. Pigment Yellow 155, C.I. Pigment Yellow 175, C.I. Pigment Yellow 180, C.I. Pigment Yellow 181, C.I. Pigment Yellow 194, C.I. Pigment Yellow 213, C.I. Pigment Yellow 214, and mixed crystals thereof; and
   a black UV curable inkjet ink containing a carbon black pigment; optionally complemented by a white ink and/or a colourless ink.

16. An inkjet printing method including the steps of:
   a) jetting a UV curable inkjet ink as defined in claim 12 on a substrate; and
   b) UV curing the jetted UV curable inkjet ink using UV LEDs having an emitting wavelength between 365 nm and 400 nm.

17. An inkjet printing method including the steps of:
a) jetting a UV curable inkjet ink as defined in claim 13 on a substrate; and
b) UV curing the jetted UV curable inkjet ink using UV LEDs having an emitting wavelength between 365 nm and 400 nm.

* * * * *